US012619531B2

(12) United States Patent
Han et al.

(10) Patent No.: US 12,619,531 B2
(45) Date of Patent: May 5, 2026

(54) APPARATUS AND METHOD FOR DISTRIBUTING AND STORING WRITE DATA HAVING DIFFERENT-TYPE ENTRIES IN PLURAL MEMORY REGIONS

(71) Applicant: SK hynix Inc., Gyeonggi-do (KR)

(72) Inventors: Hyo Byung Han, Gyeonggi-do (KR); Dong Young Seo, Gyeonggi-do (KR); Dong Hyun Cho, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 18/641,432

(22) Filed: Apr. 22, 2024

(65) Prior Publication Data
US 2025/0165389 A1      May 22, 2025

(30) Foreign Application Priority Data

Nov. 20, 2023    (KR) ......................... 10-2023-0160999

(51) Int. Cl.
*G06F 12/02*          (2006.01)
(52) U.S. Cl.
CPC ................................ G06F 12/0246 (2013.01)
(58) Field of Classification Search
CPC .................................................. G06F 12/0246
See application file for complete search history.

(56) References Cited

U.S. PATENT DOCUMENTS

| 7,409,625 B2 | 8/2008 | Corbett et al. |
| 10,802,914 B2 | 10/2020 | Ricker et al. |

| 2012/0290897 A1* | 11/2012 | Yoon | G11C 11/5628 |
| | | | 714/766 |
| 2015/0089327 A1* | 3/2015 | Youn | G11C 29/76 |
| | | | 714/768 |
| 2018/0225173 A1* | 8/2018 | Baek | G06F 11/1068 |
| 2019/0050288 A1* | 2/2019 | Singhai | G06F 11/108 |
| 2021/0182143 A1* | 6/2021 | Bolisetty | G06F 11/1068 |
| 2021/0390017 A1* | 12/2021 | Singhai | G11C 29/765 |
| 2023/0054754 A1* | 2/2023 | Oh | G11C 16/0483 |
| 2023/0214291 A1* | 7/2023 | Muthiah | G06F 3/0619 |
| | | | 714/764 |

OTHER PUBLICATIONS

Im "Delayed Partial Parity Scheme for Reliable and High-Performance Flash Memory SSD" (Year: 2010).*

* cited by examiner

*Primary Examiner* — Tasnima Matin
(74) *Attorney, Agent, or Firm* — IP & T GROUP LLP

(57) ABSTRACT

A memory system includes a memory device and a memory controller. The memory device includes a first memory region for storing plural data entries, a second memory region for storing a parity entry associated with the plural data entries, a third memory region for storing at least one partial parity entry corresponding to at least one sub-group, each sub-group including a part of the plural data entries. The memory controller generates a first partial parity entry corresponding to a first sub-group among the at least one sub-group to store the first partial parity entry in the third memory region, generates a second partial parity entry corresponding to a second sub-group among the at least one sub-group, reads the first partial parity entry from the third memory region, and performs a logical operation on the first partial parity entry and the second partial parity entry to generate the parity entry.

19 Claims, 10 Drawing Sheets

Figure 4:
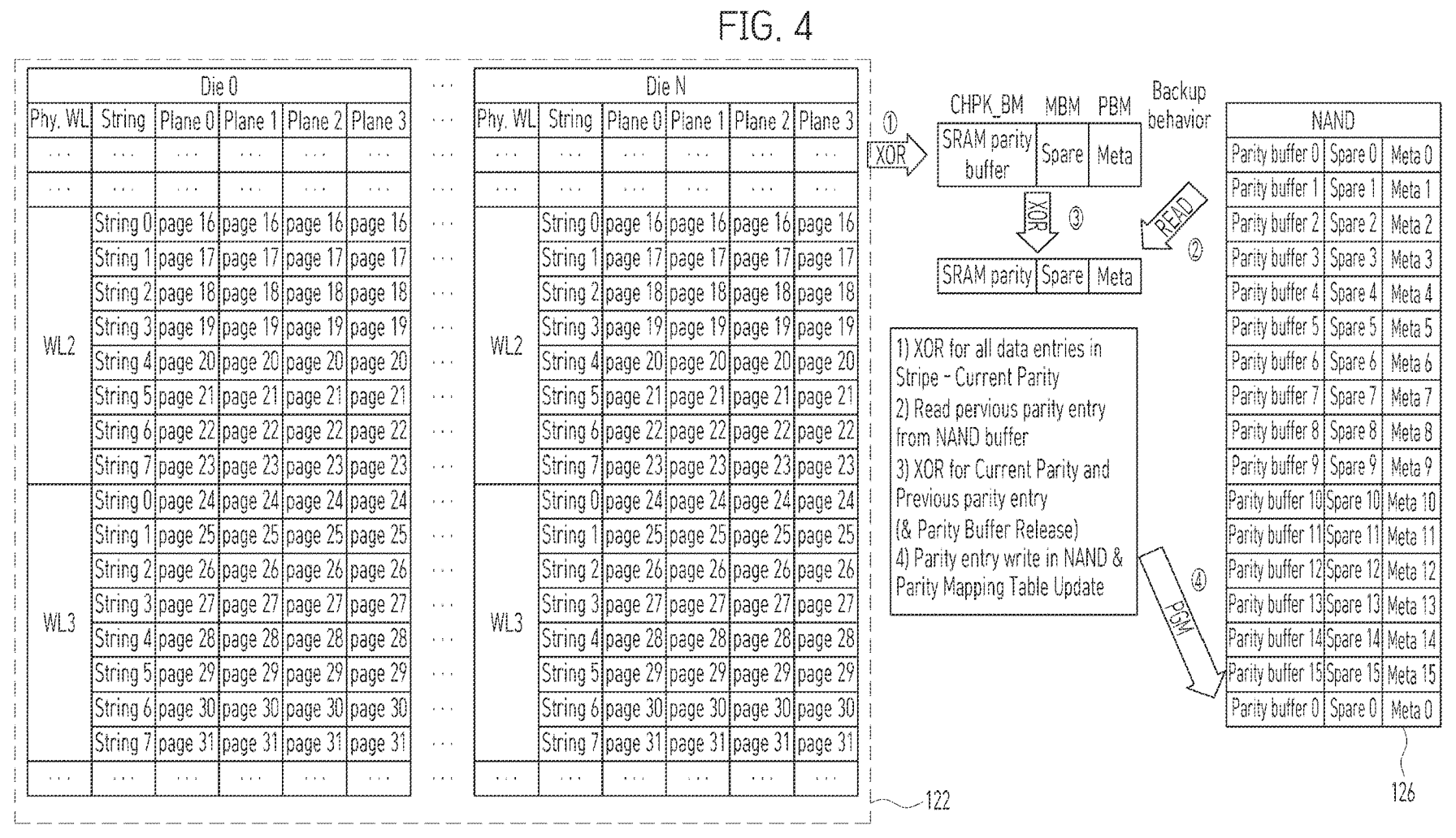

Backup behavior

CHPK_BM   MBM   PBM

SRAM parity buffer | Spare | Meta

SRAM parity entry | Spare | Meta

READ ②

XOR ③

XOR ①

PGM ④

1) XOR for all data entries in Stripe – Current Parity
2) Read pervious parity entry from NAND buffer
3) XOR for Current Parity and Previous parity entry (& Parity Buffer Release)
4) Parity entry write in NAND & Parity Mapping Table Update

NAND

| Parity buffer 0 | Spare 0 | Meta 0 |
| Parity buffer 1 | Spare 1 | Meta 1 |
| Parity buffer 2 | Spare 2 | Meta 2 |
| Parity buffer 3 | Spare 3 | Meta 3 |
| Parity buffer 4 | Spare 4 | Meta 4 |
| Parity buffer 5 | Spare 5 | Meta 5 |
| Parity buffer 6 | Spare 6 | Meta 6 |
| Parity buffer 7 | Spare 7 | Meta 7 |
| Parity buffer 8 | Spare 8 | Meta 8 |
| Parity buffer 9 | Spare 9 | Meta 9 |
| Parity buffer 10 | Spare 10 | Meta 10 |
| Parity buffer 11 | Spare 11 | Meta 11 |
| Parity buffer 12 | Spare 12 | Meta 12 |
| Parity buffer 13 | Spare 13 | Meta 13 |
| Parity buffer 14 | Spare 14 | Meta 14 |
| Parity buffer 15 | Spare 15 | Meta 15 |
| Parity buffer 0 | Spare 0 | Meta 0 |

126

122

Die N

| Phy. WL | String | Plane 0 | Plane 1 | Plane 2 | Plane 3 |
|---|---|---|---|---|---|
| ... | ... | ... | ... | ... | ... |
| WL2 | String 0 | page 16 | page 16 | page 16 | page 16 |
| | String 1 | page 17 | page 17 | page 17 | page 17 |
| | String 2 | page 18 | page 18 | page 18 | page 18 |
| | String 3 | page 19 | page 19 | page 19 | page 19 |
| | String 4 | page 20 | page 20 | page 20 | page 20 |
| | String 5 | page 21 | page 21 | page 21 | page 21 |
| | String 6 | page 22 | page 22 | page 22 | page 22 |
| | String 7 | page 23 | page 23 | page 23 | page 23 |
| WL3 | String 0 | page 24 | page 24 | page 24 | page 24 |
| | String 1 | page 25 | page 25 | page 25 | page 25 |
| | String 2 | page 26 | page 26 | page 26 | page 26 |
| | String 3 | page 27 | page 27 | page 27 | page 27 |
| | String 4 | page 28 | page 28 | page 28 | page 28 |
| | String 5 | page 29 | page 29 | page 29 | page 29 |
| | String 6 | page 30 | page 30 | page 30 | page 30 |
| | String 7 | page 31 | page 31 | page 31 | page 31 |
| ... | ... | ... | ... | ... | ... |

Die 0

| Phy. WL | String | Plane 0 | Plane 1 | Plane 2 | Plane 3 |
|---|---|---|---|---|---|
| ... | ... | ... | ... | ... | ... |
| WL2 | String 0 | page 16 | page 16 | page 16 | page 16 |
| | String 1 | page 17 | page 17 | page 17 | page 17 |
| | String 2 | page 18 | page 18 | page 18 | page 18 |
| | String 3 | page 19 | page 19 | page 19 | page 19 |
| | String 4 | page 20 | page 20 | page 20 | page 20 |
| | String 5 | page 21 | page 21 | page 21 | page 21 |
| | String 6 | page 22 | page 22 | page 22 | page 22 |
| | String 7 | page 23 | page 23 | page 23 | page 23 |
| WL3 | String 0 | page 24 | page 24 | page 24 | page 24 |
| | String 1 | page 25 | page 25 | page 25 | page 25 |
| | String 2 | page 26 | page 26 | page 26 | page 26 |
| | String 3 | page 27 | page 27 | page 27 | page 27 |
| | String 4 | page 28 | page 28 | page 28 | page 28 |
| | String 5 | page 29 | page 29 | page 29 | page 29 |
| | String 6 | page 30 | page 30 | page 30 | page 30 |
| | String 7 | page 31 | page 31 | page 31 | page 31 |
| ... | ... | ... | ... | ... | ... |

DATA PROGRAM
RAID 5

| A1 | A2 | A3 | A4 | Ap |
| B1 | B2 | B3 | Bp | B4 |
| C1 | C2 | Cp | C3 | C4 |
| D1 | Dp | D2 | D3 | D4 |
| Ep | E1 | E2 | E3 | E4 |

| Plane1 | Plane2 | Plane3 | Plane4 | Plane5 |

FIG. 8

| Die n(Parity Die) | | | |
|---|---|---|---|
| Plane 0 | Plane 1 | Plane 2 | Plane 3 |
| parity 0 | parity 1 | parity 2 | parity 3 |
| parity 4 | parity 5 | parity 6 | parity 7 |
| parity 8 | parity 9 | parity 10 | parity 11 |
| parity 12 | parity 13 | parity 14 | parity 15 |
| parity 16 | parity 17 | parity 18 | parity 19 |
| parity 20 | parity 21 | parity 22 | parity 23 |
| parity 24 | parity 25 | parity 26 | parity 27 |
| parity 28 | parity 29 | parity 30 | parity 31 |
| parity 32 | parity 33 | parity 34 | parity 35 |
| parity 36 | parity 37 | parity 38 | parity 39 |
| parity 40 | parity 41 | parity 42 | parity 43 |
| parity 44 | parity 45 | parity 46 | parity 47 |
| parity 48 | parity 49 | parity 50 | parity 51 |
| parity 52 | parity 53 | parity 54 | parity 55 |
| parity 56 | parity 57 | parity 58 | parity 59 |
| parity 60 | parity 61 | parity 62 | parity 63 |

WP[0]

PP[0]     PP[9]

| Die 1 | | | |
|---|---|---|---|
| Plane 0 | Plane 1 | Plane 2 | Plane 3 |
| page 0 | page 0 | page 0 | page 0 |
| page 1 | page 1 | page 1 | page 1 |
| page 2 | page 2 | page 2 | page 2 |
| page 3 | page 3 | page 3 | page 3 |
| page 4 | page 4 | page 4 | page 4 |
| page 5 | page 5 | page 5 | page 5 |
| page 6 | page 6 | page 6 | page 6 |
| page 7 | page 7 | page 7 | page 7 |
| page 8 | page 8 | page 8 | page 8 |
| page 9 | page 9 | page 9 | page 9 |
| page 10 | page 10 | page 10 | page 10 |
| page 11 | page 11 | page 11 | page 11 |
| page 12 | page 12 | page 12 | page 12 |
| page 13 | page 13 | page 13 | page 13 |
| page 14 | page 14 | page 14 | page 14 |
| page 15 | page 15 | page 15 | page 15 |

| | Die 0 | | | |
|---|---|---|---|---|
| | Plane 0 | Plane 1 | Plane 2 | Plane 3 |
| String 0 | page 0 | page 0 | page 0 | page 0 |
| String 1 | page 1 | page 1 | page 1 | page 1 |
| String 2 | page 2 | page 2 | page 2 | page 2 |
| String 3 | page 3 | page 3 | page 3 | page 3 |
| String 4 | page 4 | page 4 | page 4 | page 4 |
| String 5 | page 5 | page 5 | page 5 | page 5 |
| String 6 | page 6 | page 6 | page 6 | page 6 |
| String 7 | page 7 | page 7 | page 7 | page 7 |
| String 0 | page 8 | page 8 | page 8 | page 8 |
| String 1 | page 9 | page 9 | page 9 | page 9 |
| String 2 | page 10 | page 10 | page 10 | page 10 |
| String 3 | page 11 | page 11 | page 11 | page 11 |
| String 4 | page 12 | page 12 | page 12 | page 12 |
| String 5 | page 13 | page 13 | page 13 | page 13 |
| String 6 | page 14 | page 14 | page 14 | page 14 |
| String 7 | page 15 | page 15 | page 15 | page 15 |

WL0

WL1

APPARATUS AND METHOD FOR DISTRIBUTING AND STORING WRITE DATA HAVING DIFFERENT-TYPE ENTRIES IN PLURAL MEMORY REGIONS

CROSS-REFERENCE TO RELATED APPLICATIONS

This patent application claims the benefit of priority under 35 U.S.C. § 119 to Korean Patent Application No. 10-2023-0160999 filed on Nov. 20, 2023, the entire disclosure of which is incorporated herein by reference.

TECHNICAL FIELD

One or more embodiments of the present disclosure described herein relate to a memory system or a memory device, and an operation method thereof, and more particularly, to an apparatus and a method for distributing and programming write data entries in plural regions of the memory device.

BACKGROUND

A data processing system includes a memory system or a data storage device. The data processing system can be developed to store more voluminous data in the data storage device, store data in the data storage device faster, and read data stored in the data storage device faster. The memory system or the data storage device can include non-volatile memory cells and/or volatile memory cells for storing data. To improve data safety, data can be distributed and stored in plural regions of the memory device.

BRIEF DESCRIPTION OF THE DRAWINGS

The description herein makes reference to the accompanying drawings wherein like reference numerals refer to like parts throughout the figures.

FIG. 3 is a diagram for describing operations of a first part in a procedure performed within a memory system according to another embodiment of the present disclosure.

FIG. 4 is a diagram for describing operations of a second part in the procedure performed within a memory system according to another embodiment of the present disclosure.

FIG. 5 is a diagram for describing operations of a third part in the procedure performed within a memory system according to another embodiment of the present disclosure.

FIG. 7 is a diagram illustrating a configuration of redundant array of independent disks (RAID).

FIG. 8 is a diagram for describing how to distribute and store plural data entries in a memory device, according to an embodiment of the present disclosure.

DETAILED DESCRIPTION

Figure 1:
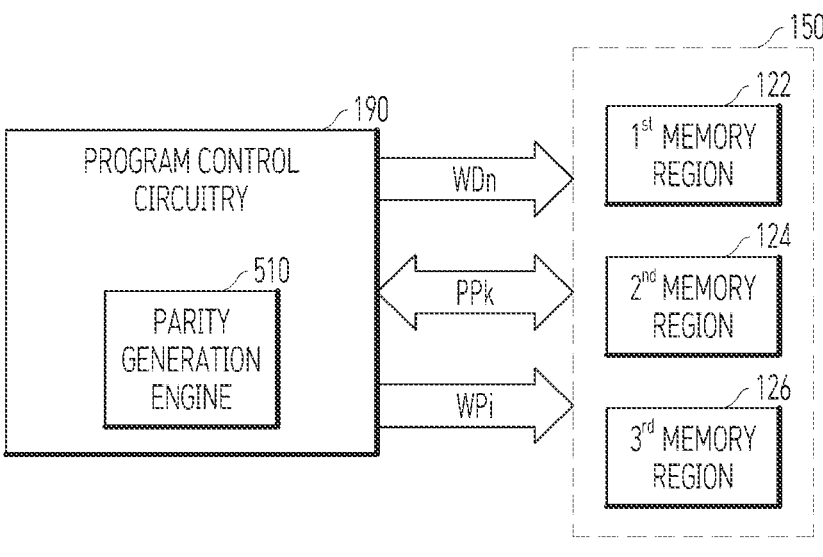
FIG. 1 is a diagram illustrating a configuration of a data storage apparatus according to an embodiment of the present disclosure.

Various embodiments of the present disclosure are described below with reference to the accompanying drawings. Elements and features of this disclosure, however, may be configured or arranged differently to form other embodiments, which may be variations of any of the disclosed embodiments.

In this disclosure, references to various features (e.g., elements, structures, modules, components, steps, operations, characteristics, etc.) included in "one embodiment," "example embodiment," "an embodiment," "another embodiment," "some embodiments," "various embodiments," "other embodiments," "alternative embodiment," and the like are intended to mean that any such features are included in one or more embodiments of the present disclosure, but may or may not necessarily be combined in the same embodiments.

In this disclosure, the terms "comprise," "comprising," "include," and "including" are open-ended. As used in the appended claims, these terms specify the presence of the stated elements and do not preclude the presence or addition of one or more other elements. The terms in a claim do not foreclose the apparatus from including additional components e.g., an interface unit, circuitry, etc.

In this disclosure, various units, circuits, or other components may be described or claimed as "configured to" perform a task or tasks. In such contexts, "configured to" is used to connote structure by indicating that the blocks/units/circuits/components include structure (e.g., circuitry) that performs one or more tasks during operation. As such, the block/unit/circuit/component can be said to be configured to perform the task even when the specified block/unit/circuit/component is not currently operational, e.g., is not turned on nor activated. Examples of block/unit/circuit/component used with the "configured to" language include hardware, circuits, memory storing program instructions executable to implement the operation, etc. Additionally, "configured to" can include a generic structure, e.g., generic circuitry, that is manipulated by software and/or firmware, e.g., an FPGA or a general-purpose processor executing software to operate in a manner that is capable of performing the task(s) at issue. "Configured to" may also include adapting a manufacturing process, e.g., a semiconductor fabrication facility, to fabricate devices, e.g., integrated circuits that are adapted to implement or perform one or more tasks.

As used in this disclosure, the term 'machine,' 'circuitry' or 'logic' refers to all of the following: (a) hardware-only circuit implementations such as implementations in only analog and/or digital circuitry and (b) combinations of circuits and software and/or firmware, such as (as applicable): (i) to a combination of processor(s) or (ii) to portions of processor(s)/software including digital signal processor(s), software, and memory(ies) that work together to cause an apparatus, such as a mobile phone or server, to perform various functions and (c) circuits, such as a microprocessor(s) or a portion of a microprocessor(s), that require software or firmware for operation, even if the software or firmware is not physically present. This definition of 'machine,' 'circuitry' or 'logic' applies to all uses of this term in this application, including in any claims. As a further example, as used in this application, the term 'machine,' 'circuitry' or 'logic' also covers an implementation of merely a processor or multiple processors or portion of a processor and its (or their) accompanying software and/or firmware. The term 'machine,' 'circuitry' or 'logic' also covers, for example, and if applicable to a particular claim element, an integrated circuit for a storage device.

As used herein, the terms 'first,' 'second,' 'third,' and so on are used as labels for nouns that they precede, and do not imply any type of ordering, e.g., spatial, temporal, logical, etc. The terms 'first' and 'second' do not necessarily imply that the first value must be written before the second value. Further, although the terms may be used herein to identify various elements, these elements are not limited by these terms. These terms are used to distinguish one element from another element that otherwise have the same or similar names. For example, a first circuitry may be distinguished from a second circuitry.

Further, the term 'based on' is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

Herein, a data entry, an entry of data, an item of data, or a data item may be a sequence of bits. For example, the data entry may include the contents of a file, a portion of the file, a page in memory, an object in an object-oriented program, a digital message, a digital scanned image, a part of a video or audio signal, metadata or any other entity which can be represented by a sequence of bits. According to an embodiment, the data entry may include a discrete object. According to another embodiment, the data entry may include a unit of information processed or handled for a data input/output operation. According to another embodiment, the data entry may include a unit of information within a transmission packet between two different components.

An embodiment in the present disclosure can provide a memory system including a memory device, a data processing system including the memory system, and an operation process or a method, which may quickly and reliably process data into a memory device by reducing operational complexity and performance degradation of the memory system, thereby enhancing usage efficiency of the memory device.

An embodiment of the present disclosure can provide an apparatus or a method for distributing a write data entry over plural regions in the memory device to improve reliability or safety of data stored in the memory device.

A memory system according to an embodiment of the present disclosure can reduce internal resources used for generating a parity entry associated with plural data entries distributed in plural regions during a data program operation for programming many write data entries in the memory device.

A memory system according to an embodiment of the present disclosure can back up a partial parity entry corresponding to a small unit of data entries to a non-volatile memory device, effectively recovering partially stored data entries in a situation such as a sudden power off (SPO).

An embodiment of the present disclosure can provide a memory system including a memory device having a first memory region configured to store plural data entries, a second memory region configured to store a parity entry associated with the plural data entries, a third memory region configured to store at least one partial parity entry corresponding to at least one sub-group, each sub-group including a part of the plural data entries; and a memory controller configured to generate a first partial parity entry corresponding to a first sub-group among the at least one sub-group to store the first partial parity entry in the third memory region, generate a second partial parity entry corresponding to a second sub-group among the at least one sub-group, read the first partial parity entry from the third memory region, and perform a logical operation on the first partial parity entry and the second partial parity entry to generate the parity entry.

The memory controller can be configured to invalidate the at least one partial parity entry stored in the third memory region after storing the parity entry in the second memory region.

The first memory region can be distributed over a plurality of memory dies. A physical block address of the third memory region can be distinguished from physical block addresses of the first and second memory regions.

The first memory region and the second memory region can include a memory block including a memory cell configured to store multi-bit data, while the third memory region includes a memory block including a memory cell configured to store single-bit data.

The memory controller can repeatedly perform an operation for generating and updating at least one partial parity entry for the at least one sub-group in a preset unit including at least one sub-group. A size of the partial parity entry stored in the third memory region can be identical to a size of the parity entry stored in the second memory region.

The memory controller can read the first partial parity entry from the third memory region when a number of first partial parity entries is 1/N, where N is a natural number of 2 or more, of a total number of sub-groups associated with the plural data entries.

The logical operation can be an exclusive OR (XOR) operation.

The memory controller can include parity generating circuitry. The parity generating circuitry can include a calculation circuit configured to perform the logical operation; and a buffer coupled to the calculation circuit, the buffer having a size corresponding to a size of the sub-group.

The third memory region can be adjacent to the first memory region.

The third memory region can be a dedicated space for storing the partial parity entry.

Another embodiment in the present disclosure can provide a memory controller coupled to a memory device. The memory controller can divide plural data entries into plural sub-groups; generate a first partial parity entry corresponding to a first sub-group among the plural sub-groups to store the first partial parity entry in the memory device; generate a second partial parity entry corresponding to a second sub-group among the plural sub-groups; read the first partial parity entry stored in the memory device; and perform a logical operation on the first partial parity entry and the second partial parity entry to generate a parity entry associated with the plural data entries and store the parity entry in the memory device.

The memory controller can invalidate the first partial parity entry and the second partial parity entry after storing the parity entry in the memory device.

The first partial parity entry, the second partial parity entry, and the parity entry can be generated by parity generating circuitry included in the memory controller. The parity generating circuit can include a buffer having a size corresponding to a size of each of the plural sub-groups.

The sub-group can have a size corresponding to K number of pages, where K is a natural number, set in the memory device.

The memory controller can repeatedly perform an operation for generating and updating partial parity entries corresponding to plural sub-groups in a preset unit including at least one sub-group. A size of each partial parity entry stored in the third memory region can be identical to a size of the parity entry stored in the second memory region.

The memory controller can read the first partial parity entry from the third memory region when a number of first partial parity entries is 1/N, where N is a natural number of 2 or more, of a total number of sub-groups associated with the plural data entries.

Another embodiment in the present disclosure can provide a memory system, including plural memory regions including plural memory dies, plural memory planes, or plural memory blocks in which plural data entries and a parity entry associated with the plural data entries are distributed and stored to restore an uncorrectable error correction code (UECC); and a memory controller configured to divide plural data entries into plural sub-groups, generate a first partial parity entry corresponding to a first sub-group among the plural sub-groups to store the first partial parity entry in the memory device, generate a second partial parity entry corresponding to a second sub-group among the plural sub-groups, read the first partial parity entry stored in the memory device, and perform a logical operation on the first partial parity entry and the second partial parity entry to generate the parity entry and store the parity entry in the memory device.

The plural memory regions can be coupled via plural channels to the memory controller.

In the memory system, each of the plural sub-groups can include data stored in memory cells indicated by a same word line address and a same cell string address in the plural memory regions.

The memory controller can invalidate the first partial parity entry and the second partial parity entry after storing the parity entry in the memory device.

Embodiments will now be described with reference to the accompanying drawings, wherein like numbers reference like elements.

FIG. 1 is a diagram illustrating a configuration of a data storage apparatus according to an embodiment of the present disclosure.

Referring to FIG. 1, the data storage apparatus can include program control circuitry 190 and a memory device 150. The data storage apparatus is designed for distributed storage of data and may include various components. One example of the data storage apparatus is a memory system including volatile memory cells and non-volatile memory cells. The memory system can include the program control circuitry 190 and the memory device 150. The memory system will be described later with reference to FIGS. 9 and 10.

The memory device 150 may include plural memory regions 122, 124, 126. The first memory region 122 can include a space allocated to store data entries (or user data) WDn. The second memory region 124 can include a space allocated to store a parity entry WPi generated based on the data entries WDn. The third memory region 126 is a space allocated to store a partial parity entry PPK generated by the program control circuitry 190 in a process of storing the data entries (or user data) WDn in the memory device 150.

According to an embodiment, the plural memory regions 122, 124, 126 may be part of a cell array including non-volatile memory cells. The cell array can be formed in a two-dimensional or three-dimensional space.

According to an embodiment, each of the plural memory regions 122, 124, 126 can include at least one memory block. Herein, the memory block may refer to a group including a plurality of memory cells whose remaining data is erased by a same erase operation.

According to an embodiment, at least portions of the first memory region 122 and the second memory region 124 among the plural memory regions 122, 124, 126 can be connected to a same word line. However, the third memory region 126 is established at a location that is distinct from the first memory region 122 and the second memory region 124 (e.g., a different memory block, a different word line, or a different memory die).

According to an embodiment, the first memory region 122 and the second memory region 124 among the plurality of memory region 122, 124, 126 can include at least one memory block including plural memory cells, each memory cell controlled for storing multi-bit data. However, the third memory region 126 can include at least one memory block including plural memory cells, each memory cell controlled for storing single-bit data. Various embodiments of the plural memory regions 122, 124, 126 will be described later with reference to FIGS. 3 to 10.

The program control circuitry 190 may perform an operation to store data entries (or user data) WDn in the memory device 150. The data entries (or user data) WDn may be write data transmitted from an external device or data generated throughout an internal operation in the memory system. The program control circuitry 190 may generate the partial parity entry PPK before completely storing the data entries (or user data) WDn in the memory device 150. A parity generation engine (e.g., parity generating circuitry) 510 included in the program control circuitry 190 may generate the partial parity entry PPK corresponding to some of the data entries (or user data) WDn. The parity generation engine 510 will be described later with reference to FIG. 6.

The parity generation engine 510 can generate the partial parity entry PPK by performing a logical operation on some of the data entries (or user data) WDn. According to an embodiment, the logical operation may include an exclusive OR (XOR) operation. The data entries (or user data) WDn and the parity entries WPi can be distributed and stored in a plural memory regions such as the first memory region 122 and the second memory region 124. If some of the plural memory regions are broken and data stored therein cannot be read, or an error occurs in some of the data entries (or user data) WDn, a data entry that cannot be secured or a data entry in which an error occurred can be recovered and restored based on the parity entries WPi. The usage of the parity entry WPi will be described later with reference to FIG. 7.

In a typical memory system, a parity entry for a plurality of data entries can be generated and then the parity entry and the plurality of data entries can be stored in a memory device. How many data entries one parity entry is associated with can be determined depending on characteristics of the memory device or performance of the memory system. For example, a single parity entry may be generated for 32, 64, 128, or 256 data entries. In this case, a plurality of data entries used in a process of generating a single parity entry may be temporarily stored in a buffer used or occupied by a parity generation device. As the number of data entries corresponding to one parity entry increases, the parity generation device can temporarily store a greater amount of data entries.

According to an embodiment, a size of data entries constituting the parity group may be set based on the number of cell strings. For example, a parity group can include a data entry stored in one cell string (1-String XOR scheme), and 3 bits of data can be stored in a memory cell included in the first memory region 122. In this case, the buffer occupied by the parity generation engine 510 can have a size of approximately 288 KB (=16 KB Page size*3 Bits per memory cell*3 Parity groups*2 Cores). In a case where the parity group includes data entries stored in 16 cell strings (16-String XOR scheme), the parity generation engine 510 may have a size of approximately 4.6 MB.

If a size of the buffer used by the parity generation engine 510 in the memory system is large, the size of the buffer that can be used by other components in the memory system can be reduced. A size of a volatile memory (e.g., a memory used as a buffer, a cache, etc.) operating at high speed in a memory system might be restricted because there is not enough space for memory. If a large portion of the volatile memory is allocated for parity generation, another portion of the volatile memory allocated for other operations would be reduced. This may deteriorate data input/output performance of the memory system and reduce efficiency regarding distribution and usage of resources within the memory system.

In the data storage device described in FIG. 1, the parity generation engine 510 may generate the partial parity entry PPK in order to reduce a size of the buffer in the volatile memory which is occupied and used in an operation for parity generation. For example, the parity generation engine 510 may generate a plurality of partial parity entries during a process of generating one parity entry WPi for 256 data entries.

The program control circuitry 190 can set or establish 256 data entries as one parity group. That is, one parity group may include 256 data entries and one parity entry corresponding to the 256 data entries. The program control circuitry 190 may divide the 256 entries belonging to one parity group into a plurality of sub-groups and generate a partial parity entry for each sub-group. For example, if 256 entries are divided into 16 sub-groups, one subgroup can include 16 data entries. The parity generation engine 510 in the program control circuitry 190 can generate 16 partial parity entries corresponding to the 16 sub-groups and then temporarily store the 16 partial parity entries in the third memory region 126 in the memory device 150. Thereafter, the parity generation engine 510 within the program control circuitry 190 may perform a logical operation on the 16 parity entries stored in the third memory region 126 to generate one parity entry for the 256 data entries.

Because the parity generation engine 510 generates a partial parity entry for 16 data entries, there is no need to temporarily store all 256 data entries. The parity generation engine 510 may operate using a buffer that stores the 16 data entries to generate a partial parity entry. For example, even if the number of data entries belonging to one parity group increases to 512 or 1024, the parity generation engine 510 can only use a buffer corresponding to a size of each of the sub-groups which is smaller than the parity group.

Further, in an embodiment of the present disclosure, a partial parity entry is generated in a unit of each sub-group, which is a part of the plurality of data entries, and the partial parity entry belonging to the sub-group can be stored in the memory device 150 including a non-volatile memory cell. Accordingly, the memory system including the memory device can easily recover data entries belonging to a subgroup which is already stored in the memory device 150 before a sudden power off (SPO) based on a partial parity entry for the sub-group.

Hereinafter, a method by which the memory controller including the program control circuitry 190 and the parity generation engine 510 stores a plurality of data entries in the memory device will be described in more detail.

Figure 2:
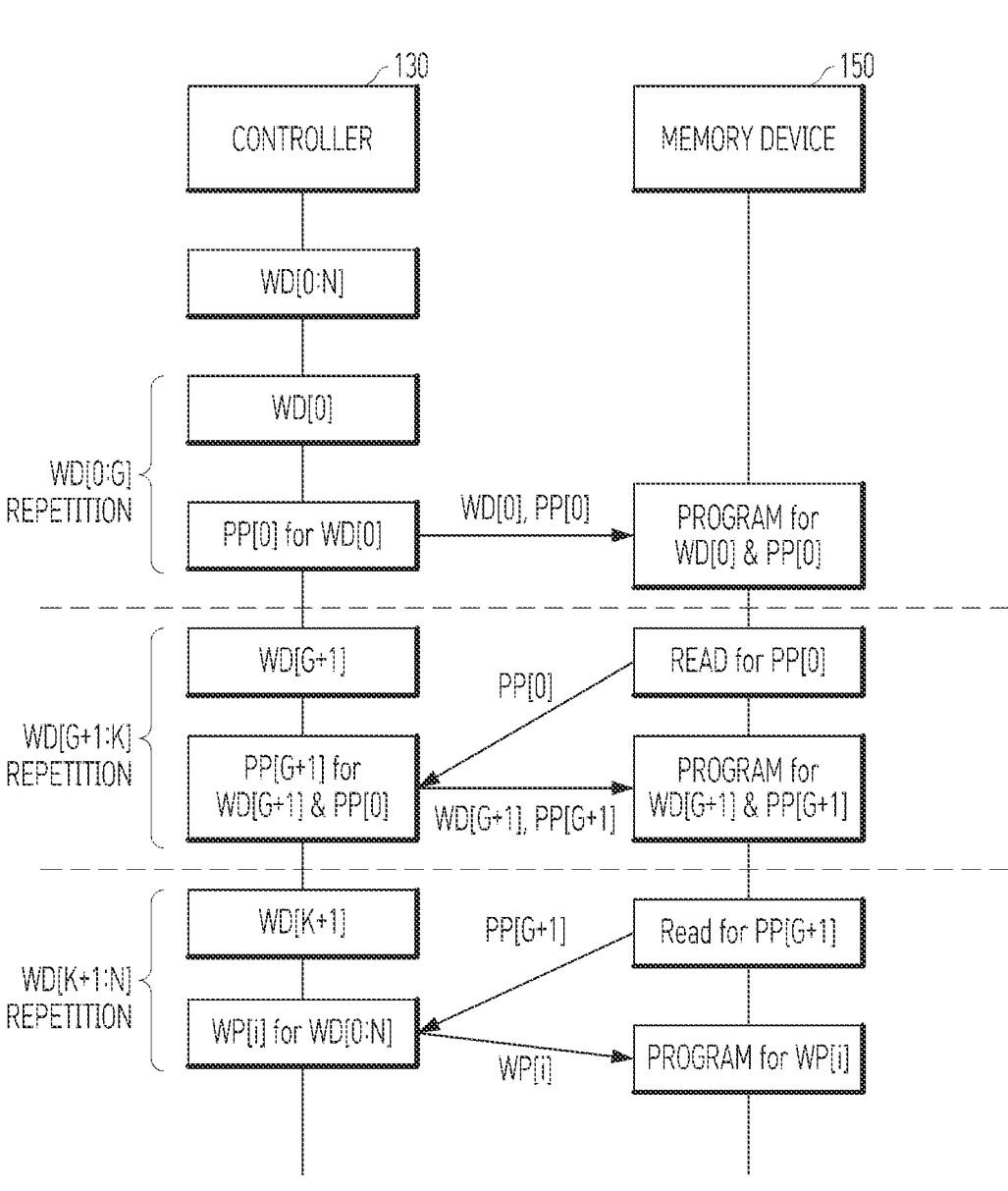
FIG. 2 is a diagram for describing a method for operating a memory system according to an embodiment of the present disclosure.

FIG. 2 is a diagram for describing a method for operating a memory system according to an embodiment of the present disclosure. The memory system may include a memory controller 130 and the memory device 150. The memory controller 130 may include the program control circuitry 190 and the parity generation engine 510 described in FIG. 1. Other configurations and operations of the memory controller 130 and the memory device 150 will be described later with reference to FIGS. 9 and 10.

Referring to FIG. 2, the memory controller 130 may set a plurality of data entries WD[0: N] constituting one parity group. The memory controller 130 may generate a first partial parity entry PP[0] for the first data entry WD[0], which is a part of the plurality of data entries WD[0:N]. The first data entry WD[0] may be one of a plurality of subgroups belonging to one parity group. According to an embodiment, the first data entry WD[0] may include plural data entries stored in plural memory cells connected to different memory planes or different memory dies having at least one same word line address.

After generating the first partial parity entry PP[0] for the first data entry WD[0], the memory controller 130 can transmit the first data entry WD[0] and the first partial parity entry PP[0] to the memory device 150. The memory device 150 can store the first data entry WD[0] and the first partial parity entry PP[0].

The memory controller 130 and the memory device 150 can repeatedly perform an operation for at least some subgroups (e.g., 1st to G+1th data entries WD[0: G] of the plurality of data entries WD[0:N], where G is a natural number greater than 1 and less than N) constituting one parity group. For example, partial parity entries PP[0: G] are generated for the first to G+1th data entries WD[0: G], and the partial parity entries PP[0: G] corresponding to the 1st to G+1th data entries WD[0: G] are transmitted to the memory device 150. Then, the memory device 150 can store the transmitted data entries WD[0: G] and partial parity entries PP[0: G].

The memory controller 130 can generate other partial parity entries for other sub-groups (e.g., G+2th to N+1th data entries WD[G+1: N], where N is a natural number greater than G) of the plurality of data entries WD[0:N] constituting one parity group. The partial parity entries can be generated for each sub-group. For example, the memory controller 130 may generate a G+2th partial parity entry PP[G+1] for a G+2th data entry WD[G+1]. In this case, the memory controller 130 may read the first partial parity entry PP[0] previously stored in the memory device 150. The memory controller 130 can perform a logical operation on the first partial parity entry PP[0] and the G+2th data entry WD[G+1] to generate the G+2th partial parity entry PP[G+1].

After generating the G+2th partial parity entry PP[G+1] for the G+2th data entry WD[G+1] and the first partial parity entry PP[0], the memory controller 130 may transmit the G+2th data entry WD[G+1] and the G+2th partial parity entry PP[G+1] to the memory device 150. The memory device 150 may store the G+2th data entry WD[G+1] and the G+2th partial parity entry PP[G+1].

Because the first partial parity entry PP[0] is reflected in the G+2th partial parity entry PP[G+1], the first partial parity entry PP[0] might be no longer needed. That is, the memory controller 130 and the memory device 150 can regard the first partial parity entry PP[0] as invalid data after storing the G+2th partial parity entry PP[G+1].

Further, the memory controller 130 and the memory device 150 can perform the above-described operations for other sub-groups (e.g., G+2th to K+1th data entries WD[G+1:K] among the plurality of data entries WD[0:N] constituting one parity group). The memory controller 130 may perform the operations for each sub-group of the G+2th to K+1th data entries WD[G+1:K]. In a process of calculating a partial parity entry (e.g., PP[G+1]), a partial parity entry (e.g., PP[0]) that has already been stored in the memory device 150 may be read. For example, after the memory controller 130 generates a partial parity entry for each of sub-groups (e.g., the G+2th to K+1th data entries WD[G+1:K], K is a natural number greater than G and less than N), the partial parity entries PP[0: G] stored in the memory device 150 can be read. The memory controller 130 can perform a logical operation on a generated partial parity entry from a data entry and a read partial parity entry obtained from the memory device 150, to generate and store a result of the logical operation (e.g., another partial parity entry PP[G+1]) in the memory device 150.

In addition, the memory controller 130 can read the partial parity entry (e.g., PP[G+1]), which has been stored in the memory device 150, in the process of generating a partial parity entry for each sub-group (e.g., K+2th to N+1th data entries WD[K+1: N]). For example, the memory controller 130 can perform a logical operation on the K+2th data entry WD[K+1] and then perform a logical operation on a logical operation result for the K+2 data entry WD[K+1] and the read partial parity entry (e.g., PP[G+1]) to generate a first parity entry WP[0] included in parity entries WP[i]. Thereafter, the memory device 150 may store the first parity entry WP[0] for the plurality of data entries WD[0:N] constituting one parity group. Thereafter, the memory controller 130 can perform a logical operation to generate a partial parity entry for the remaining data entries (e.g., WD[K+2: N]) and then read the partial parity entry previously stored in the memory device 150. The memory controller 130 can perform a logical operation on the result of the logical operation and the read partial parity entry to generate another parity entry constituting the parity entries WP[i]. After performing a logical operation to generate the parity entries WP[i], the memory controller 130 can transmit the parity entries WP[i] to the memory device 150. The memory device 150 can store the parity entries WP[i] in preset locations (e.g., the second memory region 124 shown in FIG. 1).

As described above, a procedure for generating the parity entries WP[i] corresponding to the plurality of data entries WD[0:N] belonging to one parity group can be largely divided into three parts. In a first part, the memory controller 130 can generate at least one partial parity entry by performing a logical operation on data entries corresponding to each sub-group and store the generated partial parity entry in the third memory region 126 of the memory device 150.

In a second part, the memory controller 130 can perform a logical operation on data entries corresponding to each sub-group and read the partial parity entry stored in the memory device 150 during the first part. Thereafter, the memory controller 130 can update the partial parity entry by performing a logical operation on a result of the logical operation and the partial parity entry read from the memory device 150. The memory controller 130 can transmit the updated partial parity entry to the memory device 150. The memory device 150 can store the updated partial parity entry in the third memory region 126 of the memory device 150.

In a third part, the memory controller 130 can perform a logical operation on the data entries corresponding to each sub-group and read the partial parity entry stored in the memory device 150 during the second part. Thereafter, the memory controller 130 can perform a logical operation on a result of the logical operation and the partial parity entry read from the memory device 150 to update the partial parity entry and generate parity entries WP[i]. The memory device 150 can store the parity entries WP[i] in the second memory region 124 of the memory device 150.

According to an embodiment, a size of the partial parity entry is substantially the same as a size of the parity entry. That is, an operation for generating a partial parity entry for each sub-group of the data entries WD[0:N] belonging to one parity group can be divided based on the size of the parity entry. If a parity group is set to include 24 data entries (e.g., WD[0:23]) and 8 parity entries (e.g., WP[0:7]), each of the first to third parts can be performed in a unit of each 8 sub-groups. For example, the first part can be performed for the 1st to 8th sub-groups WD[0:7], the second part can be performed for the 9th to 16th sub-groups WD[8:15], and the third part can be performed for the 17th to 24th sub-groups WD[16:23]. If a parity group is set to include 16 data entries, the memory controller 130 can only perform operations in the first and third parts without the second part. Additionally, when a parity group is set to include 32 data entries, the memory controller 130 can perform operations in the first part, the two-time second parts, and the third part. Each time each operation is repeated, the partial parity entry can be updated. When finally updated, an updated one may become a parity entry for the parity group. Through this procedure, even if the number of data entries increases, a size of the third memory region 126 storing partial parity entries, as well as a buffer used for generating a parity entry, might not increase.

Through the above-described operations, the memory controller 130 does not need to store the plurality of data entries WD[0:N] corresponding to the parity entries WP[i] in the buffer. The memory controller 130 can generate a partial parity entry using only a buffer having a size corresponding to each sub-group and then store the partial parity entry in the memory device 150. Thereafter, the memory controller 130 may read the partial parity entry stored in the memory device 150, perform a logical operation on the read partial parity entry, and store the generated parity entry WP[i] in the memory device 150. In a procedure of storing the plurality of data entries WD[0:N], additional operations of storing a partial parity entry in the memory device 150 and reading the stored partial parity entry again might cause slightly increasing a time required to store the plurality of data entries WD[0:N] in the memory device 150. However, the memory controller 130 can reduce a size of the buffer used to generate a parity entry. The memory controller 130 can improve efficiency of resource usage in a restricted operating environment, such as a portable device or an ultra-small device, where it is difficult for the memory controller 130 to include a large amount of volatile memory or an interface operatively engaged with a large capacity volatile memory.

Hereinafter, a method for storing data entries in the memory device 150 will be described with reference to FIGS. 3 to 5. The memory device 150 may store data entries in a manner that includes data stored in 16 cell strings (16-String XOR scheme). A parity entry can be as large as 16 cell strings. When a parity group includes data entries (i.e., data stored in 272 cell strings) corresponding to 1st to 34th word lines (e.g., WL0 to WL33), locations where parity entries are stored can be determined as memory cells coupled to 33rd and 34th word lines WL32, WL33 in the last memory plane (Plane3) of the last memory die (Die N) of the line.

Figure 3:
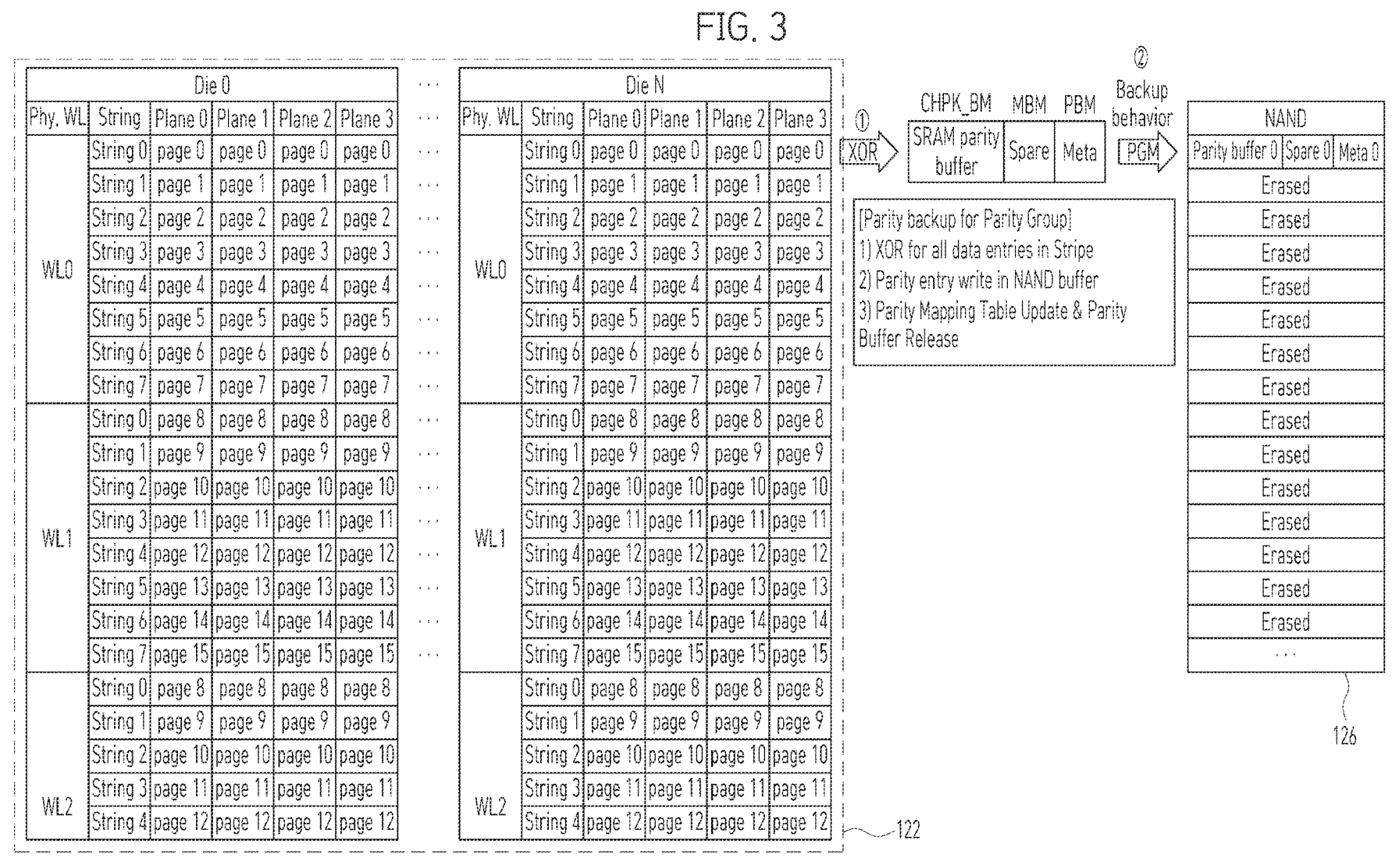

FIG. 3 is a diagram for describing operations of the first part performed within a memory system according to another embodiment of the present disclosure. Herein, the operations of the first part can be performed when a partial parity entry for a data entry belonging to a parity group is not stored in the memory device 150.

Referring to FIGS. 1 to 3, a first memory region 122 in which data entries within the memory device 150 are stored may be distributed over N+1 memory dies Die 0, . . . , Die N. Each memory die Die 0, . . . , Die N may include four memory planes Plane0, Plane1, Plane2, Plane3. Eight cell strings String0, String1, String2, String3, String4, String5, String6, String7 can be connected to a single word line (e.g., WL0).

Referring to FIGS. 1 to 3, a plurality of data entries included in one parity group may be divided into a plurality of sub-groups. For example, the memory controller 130 can set each sub-group on a page basis. For example, the first sub-group page0 can include data stored in plural memory cells (that is, (N+1)*4 memory cells) included in a first cell string String0 connected to a first word line WL0 in the four memory planes Plane0, Plane1, Plane2, Plane3 of the N+1 memory dies Die 0, . . . , Die N.

The parity generation engine 510 described in FIG. 1 can perform a logical operation (e.g., an XOR operation) on the first sub-group page0. The first partial parity entry may include a result of a logical operation stored in a buffer (SRAM parity buffer) in the parity generation engine 510 and meta data (Meta). Herein, the meta data (Meta) may include information indicating that the first partial parity entry is associated with the first sub-group page0.

After all data included in the first sub-group page0 is stored in the first memory region 122, the first partial parity entry (Parity buffer 0, Spare 0, Meta 0) can be transferred to the memory device 150. The first partial parity entry (Parity buffer 0, Spare 0, Meta 0) can be stored in a third memory region 126.

The memory controller 130 can generate partial parity entries for a second sub-group page1, a third sub-group page2, and a fourth sub-group page3, and sequentially store the generated partial parity entries in the third memory area 126.

FIG. 4 is a diagram for describing operations of the second part performed within a memory system according to another embodiment of the present disclosure. Herein, the operations of the second part can be performed when at least some partial parity entries for some data entries belonging to the parity group have been stored in the memory device 150. For example, referring to FIG. 3, 16 partial parity entries for 16 sub-groups page0 to page15 stored in plural memory cells connected to the first word line WL0 and the second word line WL1 can be stored in the third memory area 126. Herein, the 16 partial parity entries corresponding to 16 sub-groups may be 1/N of a total number of sub-groups which are associated with all data entries stored in the first memory region 122 (e.g., the data entries WD[0:N] shown in FIG. 2), where N is a natural number of 2 or more.

Referring to FIG. 4, the memory controller 130 can read the partial parity entry stored in the memory device 150 in a process of generating a partial parity entry for some other data entries belonging to the parity group. After performing a logical operation for a sub-group, the memory controller 130 can generate a new partial parity entry by performing a logical operation on the result of the logical operation and the partial parity entry read from the memory device 150.

The memory controller 130 may perform a logical operation (e.g., XOR operation) on the 17th sub-group page16 belonging to the parity group (①).

Afterwards, the memory controller 130 can read the first partial parity entry (Parity buffer 0, Spare 0, Meta 0) stored in the third memory region 126 in the memory device 150 (②).

The memory controller 130 may update the first partial parity entry by performing a logical operation (e.g., XOR operation) on the result of the 17th sub-group page16 and the first partial parity entry to generate a 17th partial parity entry (③).

The memory controller 130 can store the updated first partial parity entry (Parity buffer 0, Spare 0, Meta 0), i.e., the 17th partial parity entry, in the third memory region 126 in the memory device 150 (④).

Referring to FIGS. 3 and 4, the memory controller 130 can generate partial parity entries, each for each sub-group, but the number of partial parity entries is limited to 16. The memory controller 130 generates a seventeenth partial parity entry by performing a logical operation on a logical operation result of a seventeenth data entry and the first partial parity entry (e.g., the seventeenth partial parity entry is updated from the first partial parity entry). The memory device 150 stores data entries in a manner that includes data stored in 16 cell strings (16-String XOR scheme). The partial parity entry has a size equal to 16 cell strings. Herein, the third memory region 126 in the memory device 150 may be used as a buffer to temporarily store partial parity entries, so that the third memory region 126 used by the memory controller 130 can be considered overheads. However, because the number of the partial parity entries is limited, the overheads can be reduced.

When the first partial parity entry is updated to the seventeenth partial parity entry and the seventeenth partial parity entry is stored in a new location, the memory controller 130 can invalidate the first partial parity entry previously stored. The invalidated first partial parity may be released from the third memory region 126. That is, the third memory region 126 might have substantially the same size as the size of the parity entries included in the parity group. The size of the third memory region 126 cannot change even if more partial parity entries are generated.

Figure 5:
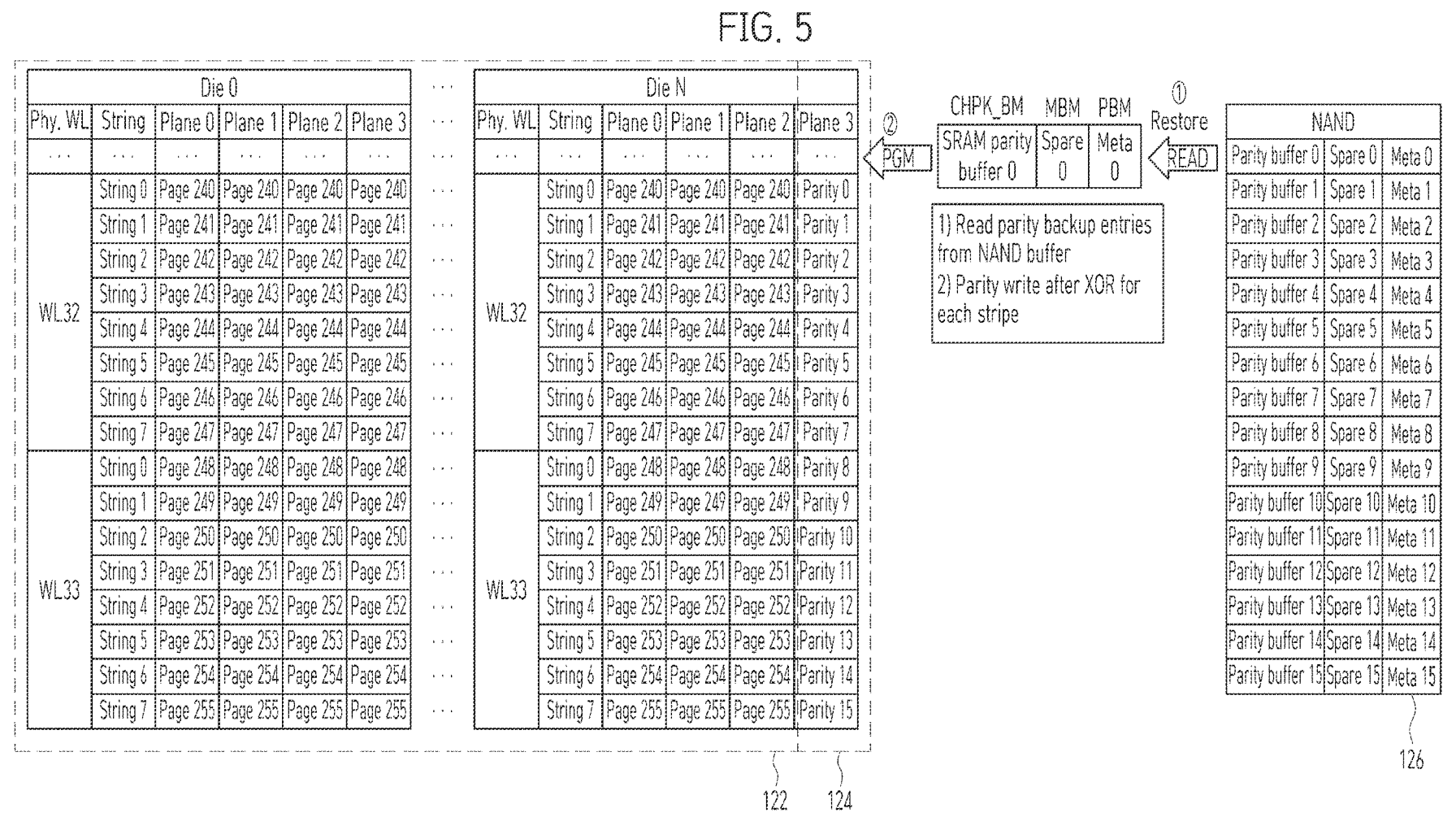

FIG. 5 is a diagram for describing operations of the third part performed within a memory system according to another embodiment of the present disclosure. Here, the operations of the third part may be performed to perform a logical operation for the last part of the data entries belonging to the parity group, update the partial parity entry to the parity entry, and store the parity entry corresponding to the parity group in the memory device 150. For example, referring to FIGS. 3 and 4, 16 partial parity entries for sub-groups (page0 to page239) stored in memory cells connected to the first word line WL0 to the 32nd word line WL31 can be stored in the third memory region 126. The operations of the second part described in FIG. 4 may be performed multiple times in a unit of two word lines.

Referring to FIG. 5, the memory controller 130 can perform a logical operation on a sub-group Page240 of data stored in a memory cell included in the first cell string String0 connected to the 33rd word line WL32. Because the last memory plane Plane3 of the last memory die DieN can be allocated for the second memory region 124 where the parity entry is stored, an amount of data included in the sub-group Page240 may be less than that in other sub-groups page0 to page239 in which partial parity entries have already been generated.

Afterwards, the memory controller 130 may read the updated partial parity entries (Parity buffer0, Spare0, Meta0) stored in the third memory region 126 in the memory device 150 (①). Thereafter, the memory controller 130 performs a logical operation on a result of the logical operation for the sub-group Page240 and the updated partial parity entry (Parity buffer0, Spare0, Meta0) to generate a first parity entry Parity0 among plural parity entries Parity0 to Parity15 corresponding to the parity group.

The memory controller 130 can repeat the same operations of the third part for the remaining sub-groups Page241 to Page255. Through this, the memory controller 130 can determine the plural parity entries Parity0 to Parity15 for the parity group including the plurality of sub-groups Page0 to Page255. The memory device 150 can store the plural parity entries Parity0 to Parity15 in the second memory region 124.

As described in FIGS. 3 to 5, one parity group can be divided into a plurality of sub-groups. The operations of generating and updating partial parity entries for the plurality of sub-groups may be performed repeatedly, corresponding to a size of the parity entries included in the parity group. Through this procedure, the parity generation engine 510, which performs logical operations to calculate parities, can be operatively engaged only with a buffer having a size smaller than a size of the data entries belonging to the parity group. Further, a size of the third memory region 126 in the memory device 150 might not increase corresponding to a size of the parity entries for the parity group. Accordingly, the efficiency of resource usage in the memory controller 130 and the memory device 150 can be improved or enhanced.

Figure 6:
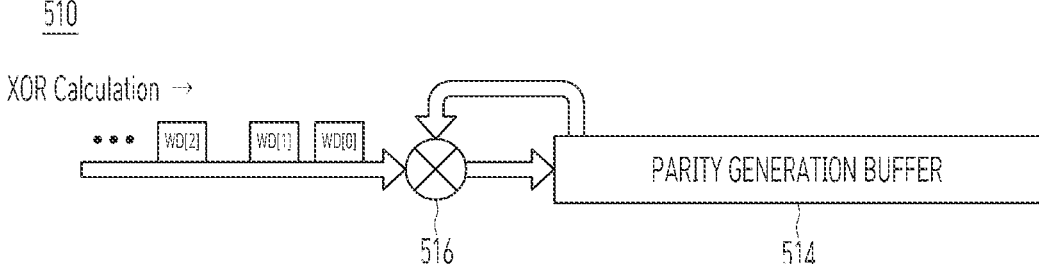
FIG. 6 is a diagram illustrating a detailed configuration of parity generation engine shown in FIG. 1, according to another embodiment of the present disclosure.

FIG. 6 is a diagram illustrating a configuration of the parity generation engine 510 shown in FIG. 1, according to another embodiment of the present disclosure.

Referring to FIG. 6, the parity generating engine 510 can include the logical operation circuit 516 that performs an exclusive OR (XOR) operation and the parity operation buffer 514 that stores data entries WD[0], WD[1], WD[2] and a parity entry.

According to an embodiment, the data entries WD[0], WD[1], WD[2] which are sequentially transmitted to the parity generating engine 510 may be sequentially transmitted to and programmed in the memory device 150. In this case, the data entries WD[0], WD[1], WD[2] can be included in a sub-group. The parity generating engine 510 may sequentially perform exclusive OR (XOR) operations on the input data entries WD[0], WD[1], WD[2] and then store a result of the exclusive OR (XOR) operations.

The parity generating engine 510 may have the parity operation buffer 514 corresponding to a size of the sub-group. For example, one sub-group may include 9 data entries and 1 parity entry. In this case, the parity generating engine 510 may perform logical operations on nine sequentially transmitted data entries (i.e., the $1^{st}$ to $9^{th}$ data entries) and output a result as a first parity entry. Afterwards, the parity generating engine 510 may calculate a second parity entry based on the $10^{th}$ to $18^{th}$ other data entries sequentially transmitted. The program control circuitry 190 described in FIG. 1 can control the amount and order of data entries transmitted to the parity generation engine 510.

The program control circuitry 190 including the parity generating engine 510 can recognize a physical location regarding a data entry sequentially transmitted to, and programmed in, the memory device 150. The parity entry output from the parity generating engine 510 can include additional information (or metadata) regarding locations where plural data entries are stored in the memory device 150.

The parity generating engine 510 described in FIG. 6 may generate a parity entry in a preset number unit of data entries based on a program order of the data entries or an order in which the data entries are transmitted to the memory device 150 through at least one channel for data program operations. Additionally, depending on the number of data entries constituting the parity group (or a sub-group) and a size of the parity entry, the size or number of sub-groups constituting the parity group may vary. According to an embodiment, the parity generation engine 510 may include a parity calculation buffer 514 corresponding to the parity entry size regardless of the size or number of sub-groups.

Figure 7:
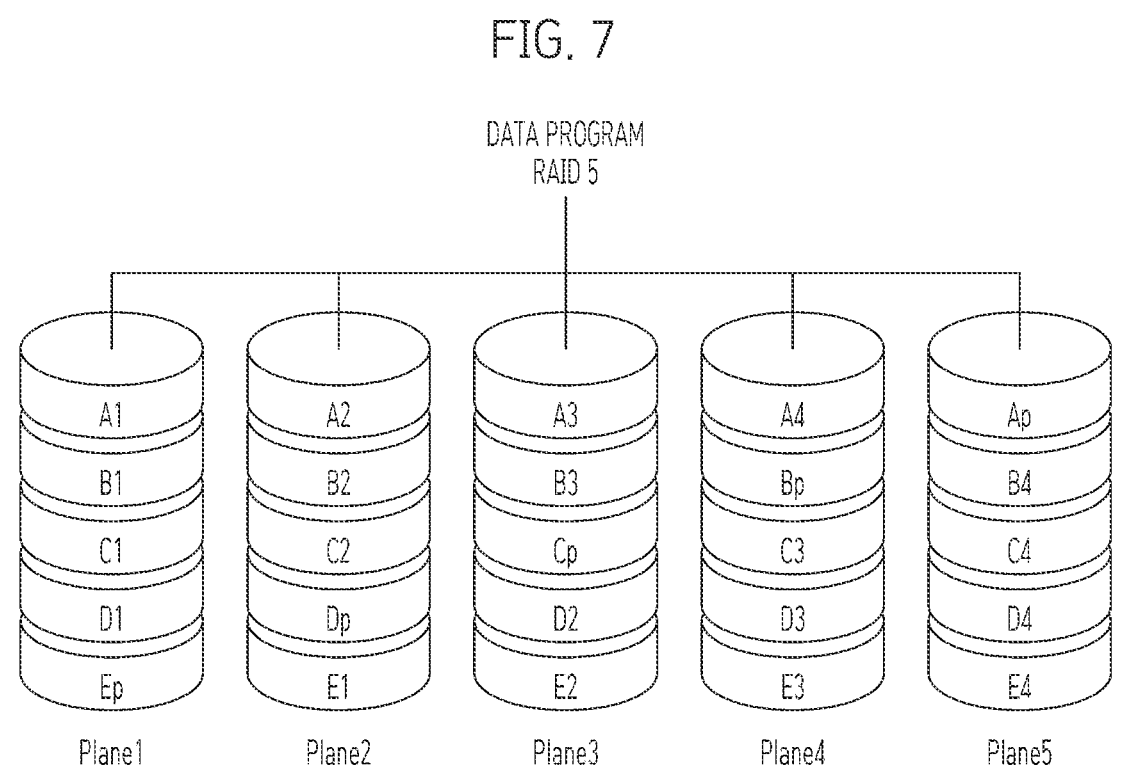

FIG. 7 is a diagram illustrating a configuration of a redundant array of independent (or inexpensive) disks (RAID) applicable to a memory device in accordance with another embodiment of the present disclosure. Specifically, FIG. 7 shows an example of using five regions (Plane1, Plane2, Plane3, Plane4, Plane5) in a Redundant Array of Independent Disk (RAID) or a Redundant Array of Inexpensive Disk (RAID).

Five regions included in the memory device using a RAID scheme can have substantially a same size. According to an embodiment, each of the five regions Plane1, Plane2, Plane3, Plane4, Plane5 included in the memory device 150 can include a memory plane, a memory block, a memory die, or the like. In another embodiment, the five regions Plane1, Plane2, Plane3, Plane4, and Plane5 can be five logical regions established by a user.

The memory system 110 can use the RAID scheme to store 4 entries of data A1, A2, A3, A4 and 1 parity Ap in five regions Plane1, Plane2, Plane3, Plane4, Plane5. Even if an error occurs in one region of the five regions Plane1, Plane2, Plane3, Plane4, Plane5, data stored in an errored region can be recovered and restored based on the other entries of data and the parity stored in the remaining four regions. For example, the parity Ap can be generated by an exclusive-OR (XOR) logical operation on the four entries of data A1, A2, A3, A4. Thereafter, when an error occurs in a second entry of data A2 among the four entries of data A1, A2, A3, A4, the second data A2 can be recovered and restored by an exclusive-OR (XOR) operation on first, third, and fourth entries of data A1, A3, A4 and the entry of parity Ap.

In addition, because it is difficult to predict at which region among the five regions Plane1, Plane2, Plane3, Plane4, Plane5 a problem will occur, locations for storing four entries of data and one entry of parity can be changed. For example, one entry of first parity Ap corresponding to the four entries of first data A1, A2, A3, A4 can stored in a fifth region Plane5, but one entry of second parity Bp corresponding to four entries of second data B1, B2, B3, B4 can be stored in a fourth region Plane4.

For generating a parity, the memory system 110 can include a parity generation engine. Referring to FIG. 4, in the five regions Plane1, Plane2, Plane3, Plane4, Plane5 of the memory device 150, four entries of first data A1, A2, A3, A4 and one entry of first parity Ap can be programmed. The parity generation engine may generate one entry of first parity Ap based on the four entries of first data A1, A2, A3, A4. In the memory system 110, four entries of first data A1, A2, A3, A4 can be stored in a first non-volatile cell region, and one entry of first parity Ap can be stored in a second non-volatile cell region. In order to program the multi-bit data, when the memory device 150 according to an embodiment of the present disclosure can perform a two-step program operation, a parity can be generated and stored in the RAID scheme. In this case, the size of the SLC buffer above described can be reduced or used efficiently.

Referring to FIG. 7, four entries of data A1, A2, A3, and A4 are used to generate one entry of parity information Ap. In order for the memory system 110 to generate one entry of parity information Ap, it must have a buffer for storing four entries of data A1, A2, A3, and A4 and one entry of parity information Ap. If the memory system 110 generates one parity based on 63 data entries, the memory system 110 should include a buffer for storing 64 entries including 63 data entries and 1 parity entry. However, referring to FIGS. 1 to 6, in a process of generating a single parity entry for 63 data entries, the memory system can divide the 63 data entries into plural sub-groups, generate a partial parity entry for each sub-group, and then temporarily store the partial parity entry to the memory device. Accordingly, the parity generation engine (i.e., parity generating circuitry) 510 can perform a parity operation (e.g., calculation for generating a parity entry) through a buffer having a storage space corresponding to a size of the sub-group rather than 63 data entries.

FIG. 8 is a diagram for describing how to distribute and store plural data entries in a memory device, according to an embodiment of the present disclosure. FIG. 8 shows an embodiment in which n number of memory dies (Die 0, Die 1, . . . , Die n−1) are allocated for the first memory region storing data entries, and the n+1th memory die (Die n) is allocated for the second memory region 124 storing parity entries.

Referring to FIG. 8, locations indicated by a same address within n number of memory dies (Die 0, Die 1, . . . , Die n−1) can be set to a same parity group. For example, plural sub-groups page0 to page15 can be set in each cell string and each word line in the memory planes (Plane0, Plane1, Plane2, Plane3) of each memory die (Die 0, Die . . . , 1, . . . , Die n−1). Referring to FIG. 8, one parity group can include a plurality of data entries and parity entries. The plurality data entries can be stored in memory cells connected to plural word lines WL0, WL1 of each memory plane (Plane0, Plane1, Plane2, Plane3). The plurality of parity entries can be stored in memory cells indicated by same addresses in the n+1th memory die (Die n).

For example, the memory controller 130 may generate the first partial parity entry PP[0] for the first sub-group page0 and temporarily store the first partial parity entry PP[0] in the third memory region 126. Then, the memory controller 130 can perform a logical operation on the ninth sub-group page8. The memory controller 130 performs a logical operation on the first partial parity entry PP[0] and a result PP[8] of the logical operation for the ninth sub-group page8 to generate the first parity entry (WP[0], parity0). After the memory controller 130 transmits the first parity entry (WP [0], parity0) to the memory device 150, the memory device 150 can store the first parity entry (WP[0], parity0) in the n+1th memory die (Die n) allocated for storing the parity entries. Unlike FIG. 5, FIG. 8 shows an embodiment in which the memory device 150 includes a separate memory die in which parity entries only are stored. Accordingly, all sub-groups belonging to one parity group can have a same size of data.

Referring to FIGS. 3 to 8, a scheme in which the parity group associated with data stored in the memory device 150 is configured may vary depending on the embodiment. Based on the scheme, whether an error occurring at a certain location can be recovered can be determined. The scheme can be set differently depending on error recovery performance required for the memory device 150. Additionally, the scheme for the parity group can be changed depending on the operating characteristics of the memory device 150. As the number of parity entries stored in the memory device 150 decreases, the number of data entries stored in the memory device 150 having a same storage capability can increase.

Figure 9:
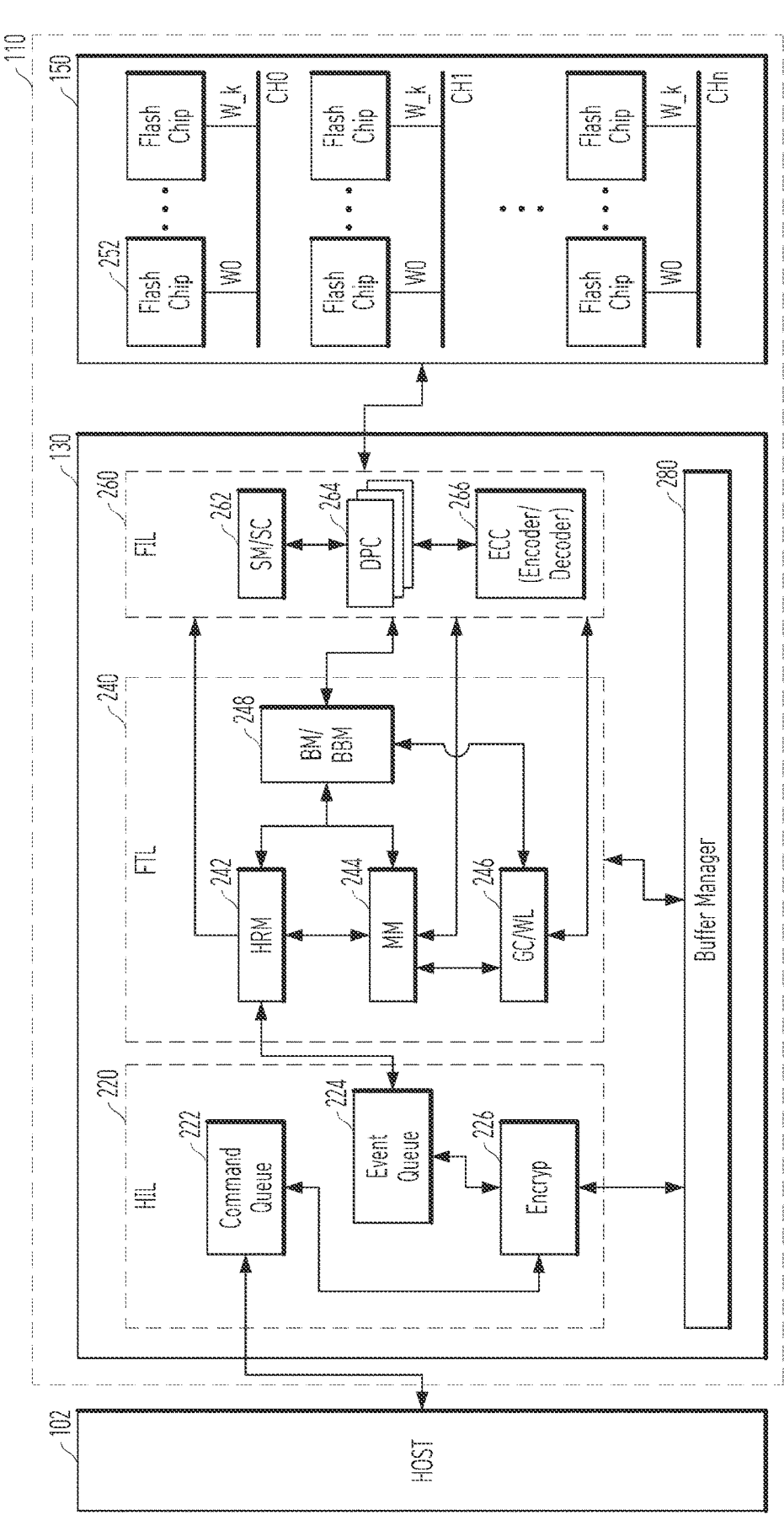
FIG. 9 is a diagram illustrating a configuration of a memory system according to another embodiment of the present disclosure.

FIG. 9 is a diagram illustrating a configuration of a data processing system 100 according to an embodiment of the present disclosure.

Referring to FIG. 9, the data processing system 100 may include a host 102 engaged or coupled with a memory system, such as memory system 110. For example, the host 102 and the memory system 110 can be coupled to each other via a data bus, a host cable and the like to perform data communication.

The memory system 110 may include a memory device 150 and a memory controller 130. The memory device 150 and the memory controller 130 in the memory system 110 may be considered components or elements physically separated from each other. The memory device 150 and the memory controller 130 may be connected via at least one data path. For example, the data path may include a channel and/or a way. According to an embodiment, the program control circuitry 190 coupled to the memory device 150 shown in FIG. 1 can be included in the memory controller 130, 400 shown in FIGS. 9 and 10. The memory controller 130, 400 shown in FIGS. 1, 9 and 10 can be implemented with a System-on-Chip (SOC).

The memory device 150 can include plural memory chips (i.e., Flash Chips) 252 coupled to the memory controller 130 through plural channels CH0, CH1, . . . , CHn and ways W0, . . . , W_k. The memory chip 252 can include a plurality of memory planes or a plurality of memory dies. According to an embodiment, the memory plane may be considered a logical or a physical partition including at least one memory block, a driving circuit capable of controlling an array including a plurality of non-volatile memory cells, and a buffer that can temporarily store data inputted to, or outputted from, non-volatile memory cells. Each memory plane or each memory die can support an interleaving mode in which plural data input/output operations are performed in parallel or simultaneously. According to an embodiment, memory blocks included in each memory plane, or each memory die, included in the memory device 150 can be grouped to input/output plural data entries as a super memory block. An internal configuration of the memory device 150 shown in FIG. 9 may be changed based on operating performance of the memory system 110. An embodiment of the present disclosure may not be limited to the internal configuration described in FIG. 9.

According to an embodiment, the memory device 150 and the memory controller 130 may be components or elements functionally divided. Further, according to an embodiment, the memory device 150 and the memory controller 130 may be implemented with a single chip or a plurality of chips.

The memory controller 130 may perform a data input/output operation (such as a read operation, a program operation, an erase operation, etc.) in response to a request or a command input from an external device such as the host 102. For example, when the memory controller 130 performs a read operation in response to a read request input from an external device, data stored in a plurality of non-volatile memory cells included in the memory device 150 is transferred to the memory controller 130. Further, the memory controller 130 can independently perform an operation regardless of the request or the command input from the host 102. Regarding an operating state of the memory device 150, the memory controller 130 can perform an operation such as garbage collection (GC), wear leveling (WL), a bad block management (BBM) for checking whether a memory block is bad and handling a bad block.

Each memory chip 252 can include a plurality of memory blocks. The memory blocks may be understood to be a group of non-volatile memory cells in which data is removed together by a single erase operation. Although not illustrated, the memory block may include a page which is a group of non-volatile memory cells that store data together during a single program operation or output data together during a single read operation. For example, one memory block may include a plurality of pages. The memory device 150 may include a voltage supply circuit capable of supplying at least one voltage into the memory block. The voltage supply circuit may supply a read voltage Vrd, a program voltage Vprog, a pass voltage Vpass, or an erase voltage Vers into a non-volatile memory cell included in the memory block.

The host 102 interworking with the memory system 110, or the data processing system 110 including the memory system 110 and the host 102, is a mobility electronic device (such as a vehicle), a portable electronic device (such as a mobile phone, an MP3 player, a laptop computer, or the like), and a non-portable electronic device (such as a desktop computer, a game machine, a TV, a projector, or the like). The host 102 may provide interaction between the host 102 and a user using the data processing system 100 or the memory system 110 through at least one operating system (OS). The host 102 transmits a plurality of commands corresponding to a user's request to the memory system 110, and the memory system 110 performs data input/output operations corresponding to the plurality of commands (e.g., operations corresponding to the user's request).

Referring to FIG. 9, the memory controller 130 in a memory system operates along with the host 102 and the memory device 150. As illustrated, the memory controller 130 may have a layered structure including the host interface (HIL) 220, a flash translation layer (FTL) 240, and the memory interface layer or flash interface layer (FIL) 260.

The host interface layer (HIL) 220, the flash translation layer (FTL) 240, and the memory interface layer or flash interface layer (FIL) 260 included in the memory system 110 described in FIG. 9 are illustrated as one embodiment. The host interface layer (HIL) 220, the flash translation layer (FTL) 240, and the flash interface layer (FIL) 260 may be implemented in various forms according to the operating performance of the memory system 110. According to an embodiment, the host interface layer (HIL) 220, the flash translation layer (FTL) 240, and the flash interface layer (FIL) 260 can perform operations through multi cores or processors having a pipelined structure included in the memory controller 130.

The host 102 and the memory system 110 may use a predetermined set of rules or procedures for data communication or a preset interface to transmit and receive data therebetween. Examples of sets of rules or procedures for data communication standards or interfaces supported by the host 102 and the memory system 110 for sending and receiving data include Universal Serial Bus (USB), Multi-Media Card (MMC), Parallel Advanced Technology Attachment (PATA), Small Computer System Interface (SCSI), Enhanced Small Disk Interface (ESDI), Integrated Drive Electronics (IDE), Peripheral Component Interconnect Express (PCIe or PCI-e), Serial-attached SCSI (SAS), Serial Advanced Technology Attachment (SATA), Mobile Industry Processor Interface (MIPI), and the like. According to an embodiment, the host 102 and the memory system 110 may be coupled to each other through a Universal Serial Bus (USB). The Universal Serial Bus (USB) is a highly scalable, hot-pluggable, plug-and-play serial interface that ensures cost-effective, standard connectivity to peripheral devices such as keyboards, mice, joysticks, printers, scanners, storage devices, modems, video conferencing cameras, and the like.

The memory system 110 may support the non-volatile memory express (NVMe). The Non-volatile memory express (NVMe) is a type of interface based at least on a Peripheral Component Interconnect Express (PCIe) designed to increase performance and design flexibility of the host 102, servers, computing devices, and the like equipped with the non-volatile memory system 110. The PCIe can use a slot or a specific cable for connecting a computing device (e.g., host 102) and a peripheral device (e.g., memory system 110). For example, the PCIe can use a plurality of pins (e.g., 18 pins, 32 pins, 49 pins, or 82 pins) and at least one wire (e.g., x1, x4, x8, or x16) to achieve high speed data communication over several hundred MB per second. According to an embodiment, the PCIe scheme may achieve bandwidths of tens to hundreds of Giga bits per second.

A buffer manager 280 in the memory controller 130 can control the input/output of data or operation information in conjunction with the host interface layer (HIL) 220, the flash translation layer (FTL) 240, and the memory interface layer or flash interface layer (FIL) 260. To this end, the buffer manager 280 can set or establish various buffers, caches, or queues in a memory, and control data input/output of the buffers, the caches, or the queues, or data transmission between the buffers, the caches, or the queues in response to a request or a command generated by the host interface layer (HIL) 220, the flash translation layer (FTL) 240, and the memory interface layer or flash interface layer (FIL) 260. For example, the memory controller 130 may temporarily store read data provided from the memory device 150 in response to a request from the host 102 before providing the read data to the host 102. Also, the memory controller 130 may temporarily store write data provided from the host 102 in a memory before storing the write data in the memory device 150. When controlling operations such as a read operation, a program operation, and an erase operation performed within the memory device 150, the read data or the write data transmitted or generated between the memory controller 130 and the memory device 150 in the memory system 110 can be stored and managed in a buffer, a queue, etc. established in the memory by the buffer manager 280. Besides the read data or the write data, the buffer manager 280 can store signal or information (e.g., map data, a read command, a program command, or etc. which is used for performing operations such as programming and reading data between the host 102 and the memory device 150) in the buffer, the cache, the queue, etc. established in the memory. The buffer manager 280 can set, or manage, a command queue, a program memory, a data memory, a write buffer/cache, a read buffer/cache, a data buffer/cache, a map buffer/cache, and etc.

The host interface layer (HIL) 220 may handle commands, data, and the like transmitted from the host 102. By way of example but not limitation, the host interface layer 220 may include a command queue manager 222 and an event queue manager 224. The command queue manager 222 may sequentially store the commands, the data, and the like received from the host 102 in a command queue, and output them to the event queue manager 224, for example, in an order in which they are stored in the command queue manager 222. The event queue manager 224 may sequentially transmit events for processing the commands, the data, and the like received from the command queue. According to an embodiment, the event queue manager 224 may classify, manage, or adjust the commands, the data, and the like received from the command queue. Further, according to an embodiment, the host interface layer 220 can include an encryption manager (Encryp) 226 configured to encrypt a response or output data to be transmitted to the host 102 or to decrypt an encrypted portion in the command or data transmitted from the host 102.

A plurality of commands or data of the same characteristic may be transmitted from the host 102, or a plurality of commands and data of different characteristics may be transmitted to the memory system 110 after being mixed or jumbled by the host 102. For example, a plurality of commands for reading data, i.e., read commands, may be delivered, or commands for reading data, i.e., a read command, and a command for programming/writing data, i.e., a write command, may be alternately transmitted to the memory system 110. The command queue manager 222 of the host interface layer 220 may sequentially store commands, data, and the like, which are transmitted from the host 102, in the command queue. Thereafter, the host interface layer 220 may estimate or predict what type of internal operations the memory controller 130 will perform according to the characteristics of the commands, the data, and the like, which have been transmitted from the host 102. The host interface layer 220 may determine a processing order and a priority of commands, data and the like based on their characteristics. According to the characteristics of the commands, the data, and the like transmitted from the host 102, the event queue manager 224 in the host interface layer 220 is configured to receive an event, which should be processed or handled internally within the memory system 110 or the memory controller 130 according to the commands, the data, and the like input from the host 102, from the buffer manager 280. Then, the event queue manager 224 can transfer the event including the commands, the data, and the like into the flash translation layer (FTL) 240.

According to an embodiment, the flash translation layer (FTL) 240 may include a host request manager (HRM) 242, a map manager (MM) 244, a state manager (GC/WL) 246, and a block manager (BM/BBM) 248. Further, according to an embodiment, the flash translation layer (FTL) 240 may implement a multi-thread scheme to perform data input/output (I/O) operations. A multi-thread FTL may be implemented through a multi-core processor using multi-thread included in the memory controller 130. For example, the host request manager (HRM) 242 may manage the events transmitted from the event queue. The map manager (MM) 244 may handle or control map data. The state manager 246 may perform an operation such as garbage collection (GC) or wear leveling (WL), after checking an operating state of the memory device 150. The block manager 248 may execute commands or instructions onto a block in the memory device 150.

The host request manager (HRM) 242 may use the map manager (MM) 244 and the block manager 248 to handle or process requests according to read and program commands and events which are delivered from the host interface layer 220. The host request manager (HRM) 242 may send an inquiry request to the map manager (MM) 244 to determine a physical address corresponding to a logical address which is entered with the events. The host request manager (HRM) 242 may send a read request with the physical address to the memory interface layer 260 to process the read request, i.e., handle the events. In one embodiment, the host request manager (HRM) 242 may send a program request (or a write request) to the block manager 248 to program data to a specific empty page storing no data in the memory device 150, and then may transmit a map update request corresponding to the program request to the map manager (MM) 244 in order to update an item relevant to the programmed data in information of mapping the logical and physical addresses to each other.

The block manager 248 may convert a program request delivered from the host request manager (HRM) 242, the map manager (MM) 244, and/or the state manager 246 into a flash program request used for the memory device 150, to manage flash blocks in the memory device 150. To maximize or enhance program or write performance of the memory system 110, the block manager 248 may collect program requests and send flash program requests for multiple-plane and one-shot program operations to the memory interface layer 260. In an embodiment, the block manager 248 sends several flash program requests to the memory interface layer 260 to enhance or maximize parallel processing of a multi-channel and multi-directional flash controller.

In an embodiment, the block manager 248 may manage blocks in the memory device 150 according to the number of valid pages, select and erase blocks having no valid pages when a free block is needed and select a block including the least number of valid pages when it is determined that garbage collection is to be performed. The state manager 246 may perform garbage collection to move valid data stored in the selected block to an empty block and erase data stored in the selected block so that the memory device 150 may have enough free blocks (i.e., empty blocks with no data).

When the block manager 248 provides information regarding a block to be erased to the state manager 246, the state manager 246 may check all flash pages of the block to be erased to determine whether each page of the block is valid. For example, to determine validity of each page, the state manager 246 may identify a logical address recorded in an out-of-band (OOB) area of each page. To determine whether each page is valid, the state manager 246 may compare a physical address of the page with a physical address mapped to a logical address obtained from an inquiry request. The state manager 246 sends a program request to the block manager 248 for each valid page. A map table may be updated by the map manager 244 when a program operation is complete.

The map manager 244 may manage map data, e.g., a logical-physical map table. The map manager 244 may process various requests, for example, queries, updates, and the like, which are generated by the host request manager (HRM) 242 or the state manager 246. The map manager 244 may store the entire map table in the memory device 150, e.g., a flash/non-volatile memory, and cache mapping entries according to the storage capacity of the memory 144. When a map cache miss occurs while processing inquiry or update requests, the map manager 244 may send a read request to the memory interface layer 260 to load a relevant map table stored in the memory device 150. When the number of dirty cache blocks in the map manager 244 exceeds a certain threshold value, a program request may be sent to the block manager 246, so that a clean cache block is made and a dirty map table may be stored in the memory device 150.

When garbage collection is performed, the state manager 246 copies valid page(s) into a free block, and the host request manager (HRM) 242 may program the latest version of the data for the same logical address of the page and concurrently issue an update request. When the state manager 246 requests the map update in a state in which the copying of the valid page(s) is not completed normally, the map manager 244 may not perform the map table update. This is because the map request is issued with old physical information when the state manger 246 requests a map update and a valid page copy is completed later. The map manager 244 may perform a map update operation to ensure accuracy when, or only if, the latest map table still points to the old physical address.

The memory interface layer or flash interface layer (FIL) 260 may exchange data, commands, state information, and the like, with a plurality of memory chips 252 in the memory device 150 through a data communication method. According to an embodiment, the memory interface layer 260 may include a status check schedule manager (SM/SC) 262 and a data path manager (DPC) 264. The status check schedule manager 262 can check and determine the operating state regarding the plurality of memory chips 252 coupled to the memory controller 130, the operating state regarding a plurality of channels CH0, CH1, . . . , CHn and the plurality of ways W0, . . . , W_k, and the like. The transmission and reception of data or commands can be scheduled in response to the operating states regarding the plurality of memory chips 252 and the plurality of channels CH0, CH1, . . . , CHn. The data path manager 264 can control the transmission and reception of data, commands, etc. through the plurality of channels CH0, CH1, . . . , CHn and ways W0, . . . , W_k based on the information transmitted from the status check schedule manager 262. According to an embodiment, the data path manager 264 may include a plurality of transceivers, each transceiver corresponding to each of the plurality of channels CH0, CH1, . . . , CHn. Further, according to an embodiment, the status check schedule manager 262 and the data path manager 264 included in the memory interface layer 260 can be implemented as, or engaged with, a memory control sequence generator.

According to an embodiment, the memory interface layer 260 may further include ECC (error correction code) circuitry 266 configured to perform error checking and correction of data transferred between the memory controller 130 and the memory device 150. The ECC circuitry 266 may be implemented as a separate module, circuit, or firmware in the memory controller 130, but may also be implemented in each memory chip 252 included in the memory device 150 according to an embodiment. The ECC circuitry 266 may include a program, a circuit, a module, a system, or an apparatus for detecting and correcting an error bit of data processed by the memory device 150.

For finding and correcting any error of data transferred from the memory device 150, the ECC circuitry 266 can include an error correction code (ECC) encoder and an ECC decoder. The ECC encoder may perform error correction encoding of data to be programmed in the memory device 150 to generate encoded data into which a parity bit is added and store the encoded data in the memory device 150. The ECC decoder can detect and correct error bits contained in the data read from the memory device 150 when the memory controller 130 reads the data stored in the memory device 150. For example, after performing error correction decoding on the data read from the memory device 150, the ECC circuitry 266 can determine whether the error correction decoding has succeeded or not, and outputs an instruction signal, e.g., a correction success signal or a correction fail signal, based on a result of the error correction decoding. The ECC circuitry 266 may use a parity bit, which has been generated during the ECC encoding process for the data stored in the memory device 150, to correct the error bits of the read data entries. When the number of the error bits is greater than or equal to the number of correctable error bits, the ECC circuitry 266 may not correct the error bits and instead may output the correction fail signal indicating failure in correcting the error bits.

According to an embodiment, the ECC circuitry 266 may perform an error correction operation based on a coded modulation such as a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), a Block coded modulation (BCM), or the like. The ECC circuitry 266 may include all circuits, modules, systems, and/or devices for performing the error correction operation based on at least one of the above-described codes.

For example, the encoder in the ECC circuitry 266 may generate a codeword that is a unit of ECC-applied data. A codeword of length n bits may include k bits of user data and (n-k) bits of parity. A code rate may be calculated as (k/n). The higher the code rate, the more user data that can be stored in a given codeword. When the length of the codeword is longer and the code rate is smaller, the error correction capability of the ECC circuitry 266 can be improved. In addition, the ECC circuitry 266 performs decoding using information read from the channels CH0, CH1, . . . , CHn. The decoder in the ECC circuitry 266 can be classified into a hard decision decoder and a soft decision decoder according to how many bits represent the information to be decoded. A hard decision decoder performs decoding with a memory cell output information expressed in 1 bit, and the 1-bit information used in this case is called hard decision information. A soft decision decoder uses more accurate memory cell output information composed of 2 bits or more, and this information is called soft decision information. The ECC circuitry 266 may correct errors included in data using the hard decision information or the soft decision information.

According to an embodiment, to increase the error correction capability, the ECC circuitry 266 may use a concatenated code using two or more codes. In addition, the ECC circuitry 266 may use a product code that divides one codeword into several rows and columns and applies a different relatively short ECC to each row and column.

In accordance with an embodiment, a manager included in the host interface layer 220, the flash translation layer (FTL) 240, and the memory interface layer or flash interface layer (FIL) 260 can be implemented with a general processor, an accelerator, a dedicated processor, a co-processor, a multi-core processor, or the like. According to an embodiment, the manager can be implemented with firmware working with a processor.

According to an embodiment, the memory device 150 is embodied as a non-volatile memory such as a flash memory, for example, a Read Only Memory (ROM), a Mask ROM (MROM), a Programmable ROM (PROM), an Erasable ROM (EPROM), an Electrically Erasable ROM (EEPROM), a Magnetic (MRAM), a NAND flash memory, a NOR flash memory, or the like. In another embodiment, the memory device 150 may be implemented by at least one of a phase change random access memory (PCRAM), a Resistive Random Access Memory (ReRAM), a ferroelectrics random access memory (FRAM), a transfer torque random access memory (STT-RAM), and a spin transfer torque magnetic random access memory (STT-MRAM), or the like.

Figure 10:
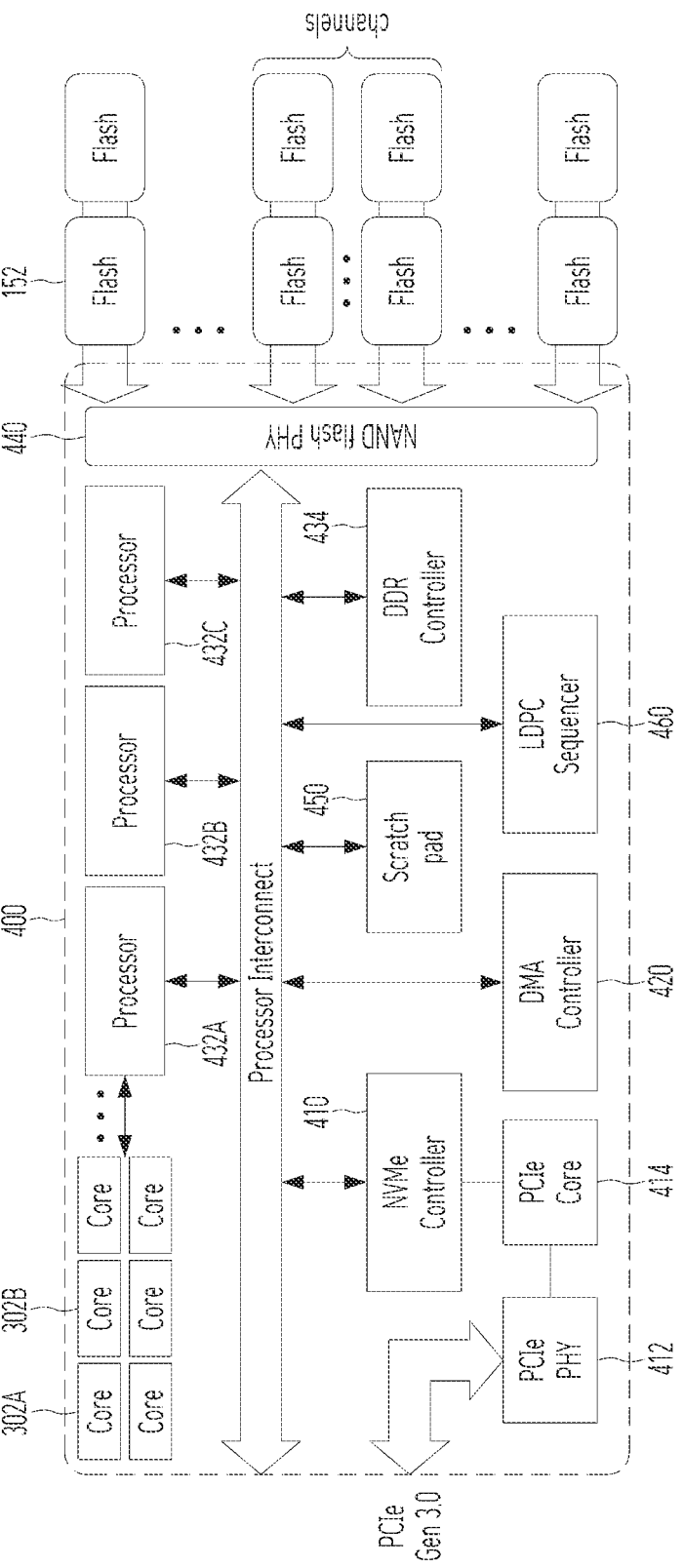
FIG. 10 is a diagram illustrating a configuration of a memory system according to another embodiment of the present disclosure.

FIG. 10 is a diagram illustrating a configuration of a data storage system according to an embodiment of the present disclosure. FIG. 10 shows a memory system including multiple cores or multiple processors, which is an example of a data storage system. The memory system may support the Non-Volatile Memory Express (NVMe) protocol.

The NVMe is a type of transfer protocol designed for a solid-state memory that can operate much faster than a conventional hard drive. The NVMe can support higher input/output operations per second (IOPS) and lower latency, resulting in faster data transfer speeds and improved overall performance of the data storage system. Unlike SATA which has been designed for a hard drive, the NVMe can leverage the parallelism of solid-state storage to enable more efficient use of multiple queues and processors (e.g., CPUs). The NVMe is designed to allow hosts to use many threads to achieve higher bandwidth. The NVMe can allow the full level of parallelism offered by SSDs to be fully exploited. However, because of limited firmware scalability, limited computational power, and high hardware contention within SSDs, the memory system might not process a large number of I/O requests in parallel.

Referring to FIG. 10, the host, which is an external device, can be coupled to the memory system through a plurality of PCIe Gen 3.0 lanes, a PCIe physical layer (PCIe PHY) 412, and a PCIe core 414. A memory controller 400 may include three embedded processors 432A, 432B, 432C, each using two cores 302A, 302B. According to an embodiment, the plurality of cores 302A, 302B or the plurality of embedded processors 432A, 432B, 432C can be implemented with a micro-processor such as a tensor processing unit (TPU).

The plurality of embedded processors 432A, 432B, 432C may be coupled to an internal DRAM controller 434 through a processor interconnect. The memory controller 400 further includes a Low Density Parity-Check (LDPC) sequencer 460, a Direct Memory Access (DMA) engine 420, a scratch pad memory 450 for metadata management, and an NVMe controller 410. Components within the memory controller 400 may be coupled to a plurality of channels connected to a plurality of memory packages 152 through a flash physical layer (NAND flash PHY) 440. The plurality of memory packages 152 may correspond to the plurality of memory chips 252 described in FIG. 9.

According to an embodiment, the NVMe controller 410 included in the memory controller 400 is a type of storage controller designed for use with solid state drives (SSDs) that use an NVMe interface. The NVMe controller 410 may manage data transfer between the SSD and the computer CPU as well as other functions such as error correction, wear leveling, and power management. The NVMe controller 410 may use a simplified, low-overhead protocol to support fast data transfer rates.

According to an embodiment, a scratch pad memory 450 may be a storage area set by the NVMe controller 410 to temporarily store data. The scratch pad memory 450 may be used to store data waiting to be written to a plurality of memory packages (i.e., Flash) 152. The scratch pad memory 450 can also be used as a buffer to speed up the writing process, typically with a small amount of Dynamic Random Access Memory (DRAM) or Static Random Access Memory (SRAM). When a write command is executed, data may first be written to the scratch pad memory 450 and then transferred to the plurality of memory packages 152 in larger blocks. The scratch pad memory 450 may be used as a temporary memory buffer to help optimize the write performance of the plurality of memory packages 152. The scratch pad memory 450 may serve as intermediate storage of data before the data is written to non-volatile memory cells.

The DMA engine 420 included in the memory controller 400 is a component that transfers data between the NVMe controller 410 and a host memory in the host system without involving a host's processor. The DMA engine 420 can support the NVMe controller 410 to directly read or write data from or to the host memory without intervention of the host's processor. According to an embodiment, the DMA engine 420 may achieve or support high-speed data transfer between a host and an NVMe device, using a DMA descriptor that includes information regarding data transfer such as a buffer address, a transfer length, and other control information.

The Low Density Parity Check (LDPC) sequencer 460 in the memory controller 400 is a component that performs error correction on data stored in the plurality of memory packages 152. Herein, an LDPC code is a type of error correction code commonly used in a NAND flash memory to reduce a bit error rate. The LDPC sequencer 460 may be designed to immediately process encoding and decoding of LDPC codes when reading and writing data from and to the NAND flash memory. According to an embodiment, the LDPC sequencer 460 may divide data into plural blocks, encode each block using an LDPC code, and store the encoded data in the plurality of memory packages 152. Thereafter, when reading the encoded data from the plurality of memory packages 152, the LDPC sequencer 460 can decode the encoded data based on the LDPC code and correct errors that may have occurred during a write or read operation. The LDPC sequencer 460 may correspond to the ECC module 266 described in FIG. 9.

In addition, although FIGS. 9 and 10 illustrate an example of a memory system including a memory device 150 or a plurality of memory packages 152 capable of storing data, the data storage system according to an embodiment of the present disclosure may not be limited to the memory system described in FIGS. 9 and 10. For example, the memory device 150, the plurality of memory packages 152, or the data storage device controlled by the controllers 130, 400 may include non-volatile or non-volatile memory devices. In FIG. 10, it is described that the memory controller 400 can perform data communication with the host 102 externally placed from the memory system (see FIG. 9) through an NVM Express (NVMe) interface and a PCI Express (PCIe). In an embodiment, the memory controller 400 may perform data communication with at least one host through a protocol such as a Compute Express Link (CXL).

Additionally, an apparatus and method for performing distributed processing or allocation/reallocation of the plurality of instructions in a controller including multi processors of the pipelined structure according to an embodiment of the present disclosure can be applicable to a data processing system including a plurality of memory systems or a plurality of data storage devices. For example, a Memory Pool System (MPS) is a very general, adaptable, flexible, reliable and efficient memory management system where a memory pool such as a logical partition of primary memory or storage reserved for processing a task or group of tasks can be used to control or manage a storage device coupled to the controller. The controller including multi processors in the pipelined structure can control data and program transfer to the memory pool controlled or managed by the memory pool system (MPS).

As above described, a memory system according to an embodiment of the present disclosure can reduce overheads that occur in a process of distributing and storing large amounts of data entries.

Further, a memory controller in the memory system according to an embodiment of the present disclosure can reduce an amount of buffer memory usage or cache memory usage during an operation of generating a parity entry for data entries distributed and stored in the memory device. Accordingly, efficiency of resource usage within the memory system can be improved in a process of performing data program operations in the memory controller implemented in a system-on-chip (SoC) which does not include a large volatile memory but has a small volatile memory.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods or operations of the computer, processor, controller, or other signal processing device, are described in detail, the code or instructions for implementing the operations of the method embodiments may transform the computer, processor, controller, or other signal processing device into a special-purpose processor for performing the methods herein.

Also, another embodiment may include a computer-readable medium, e.g., a non-transitory computer-readable medium, for storing the code or instructions described above. The computer-readable medium may be a volatile or non-volatile memory or other storage device, which may be removably or fixedly coupled to the computer, processor, controller, or other signal processing device which is to execute the code or instructions for performing the method embodiments or operations of the apparatus embodiments herein.

The controllers, processors, control circuitry, devices, modules, units, multiplexers, logics, interfaces, decoders, drivers, generators and other signal generating and signal processing features of the embodiments disclosed herein may be implemented, for example, in non-transitory logic that may include hardware, software, or both. When implemented at least partially in hardware, the controllers, processors, control circuitry, devices, modules, units, multiplexers, logics, interfaces, decoders, drivers, generators and other signal generating and signal processing features may be, for example, any of a variety of integrated circuits including but not limited to an application-specific integrated circuit, a field-programmable gate array, a combination of logic gates, a system-on-chip, a microprocessor, or another type of processing or control circuit.

When implemented at least partially in software, the controllers, processors, control circuitry, devices, modules, units, multiplexers, generators, logics, interfaces, decoders, drivers, and other signal generating and signal processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods or operations of the computer, processor, microprocessor, controller, or other signal processing device, are described in detail, the code or instructions for implementing the operations of the method embodiments may transform the computer, processor, controller, or other signal processing device into a special-purpose processor for performing the methods described herein.

While the present teachings have been illustrated and described with respect to the specific embodiments, it will be apparent to those skilled in the art in light of the present disclosure that various changes and modifications may be made without departing from the spirit and scope of the present disclosure as defined in the following claims. Furthermore, the embodiments may be combined to form additional embodiments.

What is claimed is:

1. A memory system comprising:
   a memory device comprising a first memory region configured to store plural data entries, a second memory region configured to store a parity entry corresponding to the plural data entries, a third memory region configured to store at least one partial parity entry corresponding to at least one sub-group, each sub-group including a part of the plural data entries, wherein each of the first memory region and the second memory region comprises a memory block comprising a plurality of memory cells each configured to store multi-bit data, and the third memory region comprises a memory block comprising a plurality of memory cells each configured to store single-bit data; and
   a memory controller configured to generate a first partial parity entry corresponding to a first sub-group among the at least one sub-group to store the first partial parity entry in the third memory region, generate a second partial parity entry corresponding to a second sub-group among the at least one sub-group, read the first partial parity entry from the third memory region, and perform a logical operation on the first partial parity entry and the second partial parity entry to generate the parity entry.

2. The memory system according to claim 1, wherein the memory controller is configured to invalidate the at least one partial parity entry stored in the third memory region after storing the parity entry in the second memory region.

3. The memory system according to claim 1,
   wherein the first memory region is distributed over a plurality of memory dies, and
   wherein a physical block address of the third memory region is distinguished from physical block addresses of the first and second memory regions.

4. The memory system according to claim 1,
   wherein the memory controller repeatedly performs an operation for generating and updating the at least one partial parity entry for the at least one sub-group in a preset unit including at least one sub-group, and
   wherein a size of the partial parity entry stored in the third memory region is identical to a size of the parity entry stored in the second memory region.

5. The memory system according to claim 1, wherein the memory controller reads the first partial parity entry from the third memory region when a number of first partial parity entries is 1/N of a total number of sub-groups associated with the plural data entries, where N is a natural number of 2 or more.

6. The memory system according to claim 1, wherein the logical operation is an exclusive OR (XOR) operation.

7. The memory system according to claim 1, wherein the memory controller comprises parity generating circuitry comprising:

a calculation circuit configured to perform the logical operation; and a buffer coupled to the calculation circuit, the buffer having a size corresponding to a size of the sub-group.

8. The memory system according to claim 1, wherein the third memory region is adjacent to the first memory region.

9. The memory system according to claim 1, wherein the third memory region is a dedicated space for storing the partial parity entry.

10. A memory controller coupled to a memory device, wherein the memory controller is configured to:

divide plural data entries into plural sub-groups to be stored in a first memory region of the memory device, wherein the first memory region comprises first memory cells, each first memory cell configured to store multi-bit data;

generate a first partial parity entry corresponding to a first sub-group among the plural sub-groups to store the first partial parity entry in a third memory region of the memory device, wherein the third memory region comprises third memory cells, each third memory cell configured to store single-bit data;

generate a second partial parity entry corresponding to a second sub-group among the plural sub-groups;

read the first partial parity entry stored in the third memory region of the memory device;

perform a logical operation on the first partial parity entry and the second partial parity entry to generate a parity entry associated with the plural data entries; and store the parity entry in a second memory region of the memory device, wherein the second memory region comprises second memory cells, each second memory cell configured to store multi-bit data.

11. The memory controller according to claim 10, wherein the memory controller is configured to invalidate the first partial parity entry and the second partial parity entry after storing the parity entry in the memory device.

12. The memory controller according to claim 10, wherein the first partial parity entry, the second partial parity entry, and the parity entry are generated by parity generating circuitry included in the memory controller, and wherein the parity generating circuitry comprises a buffer having a size corresponding to a size of each of the plural sub-groups.

13. The memory controller according to claim 12, wherein the sub-group has a size corresponding to K number of pages set in the memory device, where K is a natural number.

14. The memory controller according to claim 10, wherein the memory controller repeatedly performs an operation for generating and updating partial parity entries corresponding to the plural sub-groups in a preset unit including at least one sub-group, and wherein a size of each partial parity entry stored in the third memory region is identical to as a size of the parity entry stored in the second memory region.

15. The memory controller according to claim 10, wherein the memory controller reads the first partial parity entry from the third memory region when a number of first partial parity entries is 1/N of a total number of sub-groups associated with the plural data entries, where N is a natural number of 2 or more.

16. A memory system comprising:

plural memory regions comprising plural memory dies, plural memory planes, or plural memory blocks in which plural data entries and a parity entry associated with the plural data entries are distributed and stored to restore an uncorrectable error correction code (UECC); and a memory controller configured to divide the plural data entries into plural sub-groups to be stored in a first memory region of the plural memory regions, generate a first partial parity entry corresponding to a first sub-group among the plural sub-groups to store the first partial parity entry in a third memory region of the plural memory regions, generate a second partial parity entry corresponding to a second sub-group among the plural sub-groups, read the first partial parity entry stored in the third memory region of the plural memory regions, and perform a logical operation on the first partial parity entry and the second partial parity entry to generate the parity entry and store the parity entry in a second memory region of the plural memory regions, wherein each of the first memory region and the second memory region comprises first memory cells, each first memory cell configured to store multi-bit data, and wherein the third memory region comprises third memory cells, each third memory cell configured to store single-bit data.

17. The memory system according to claim 16, wherein the plural memory regions are coupled via plural channels to the memory controller.

18. The memory system according to claim 16, wherein each of the plural sub-groups comprises data stored in memory cells indicated by a same word line address and a same cell string address in the plural memory regions.

19. The memory system according to claim 16, wherein the memory controller is configured to invalidate the first partial parity entry and the second partial parity entry after storing the parity entry in the memory device.

* * * * *